United States Patent
Mozer et al.

(10) Patent No.: US 8,195,467 B2
(45) Date of Patent: *Jun. 5, 2012

(54) VOICE INTERFACE AND SEARCH FOR ELECTRONIC DEVICES INCLUDING BLUETOOTH HEADSETS AND REMOTE SYSTEMS

(75) Inventors: Todd F. Mozer, Los Altos, CA (US); Forrest S. Mozer, Berkeley, CA (US)

(73) Assignee: Sensory, Incorporated, Santa Clara, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/171,107

(22) Filed: Jul. 10, 2008

(65) Prior Publication Data

US 2009/0204410 A1    Aug. 13, 2009

Related U.S. Application Data

(60) Provisional application No. 61/028,452, filed on Feb. 13, 2008, provisional application No. 61/041,054, filed on Mar. 31, 2008.

(51) Int. Cl.
*G10L 21/00* (2006.01)
(52) U.S. Cl. .................. 704/275; 704/270
(58) Field of Classification Search .............. 704/270, 704/270.1, 275
See application file for complete search history.

(56) References Cited

U.S. PATENT DOCUMENTS

| | | | |
|---|---|---|---|
| 6,078,886 A | 6/2000 | Dragosh et al. | |
| 6,195,641 B1 | 2/2001 | Loring et al. | |
| 6,243,675 B1 | 6/2001 | Ito | |
| 6,324,514 B2 | 11/2001 | Matulich et al. | |
| 6,487,534 B1 * | 11/2002 | Thelen et al. | 704/270 |
| 6,721,705 B2 * | 4/2004 | Kurganov et al. | 704/270.1 |
| 6,738,743 B2 | 5/2004 | Sharma et al. | |
| 6,813,606 B2 * | 11/2004 | Ueyama et al. | 704/270.1 |
| 6,868,385 B1 * | 3/2005 | Gerson | 704/275 |
| 7,062,444 B2 * | 6/2006 | He et al. | 704/275 |
| 7,219,136 B1 * | 5/2007 | Danner et al. | 709/219 |
| 7,260,535 B2 | 8/2007 | Galanes et al. | |
| 2002/0072916 A1 * | 6/2002 | Friedman | 704/270.1 |
| 2003/0125955 A1 | 7/2003 | Arnold et al. | |
| 2003/0182113 A1 * | 9/2003 | Huang | 704/231 |
| 2007/0219802 A1 * | 9/2007 | Cook et al. | 704/270 |

OTHER PUBLICATIONS

Shandle, "Bluetooth headsets to get speech recognition", EETimes News and Analysis, Published on Sep. 18, 2007.*
www.tellme.com/you Tellme/Say it. Get it. Printed May 21, 2008.
Yardena Arar, PC World, "Speech Input, gPS Make Mobile Search Smarter," Wednesday, Apr. 23, 2008.

* cited by examiner

*Primary Examiner* — Jialong He
(74) *Attorney, Agent, or Firm* — Fountainhead Law Group PC

(57) ABSTRACT

Systems and methods for improving the interaction between a user and a small electronic device such as a Bluetooth headset are described. The use of a voice user interface in electronic devices may be used. In one embodiment, recognition processing limitations of some devices are overcome by employing speech synthesizers and recognizers in series where one electronic device responds to simple audio commands and sends audio requests to a remote device with more significant recognition analysis capability. Embodiments of the present invention may include systems and methods for utilizing speech recognizers and synthesizers in series to provide simple, reliable, and hands-free interfaces with users.

27 Claims, 15 Drawing Sheets

VOICE INTERFACE AND SEARCH FOR ELECTRONIC DEVICES INCLUDING BLUETOOTH HEADSETS AND REMOTE SYSTEMS

CROSS REFERENCE TO RELATED APPLICATIONS

This application claims priority to U.S. Provisional Patent Application No. 61/028,452, filed Feb. 13, 2008, entitled "Serial Speech Recognition System for Bluetooth Headsets and the like," naming Todd F. Mozer and Forrest S. Mozer as inventors. This application also claims priority to U.S. Provisional Patent Application No. 61/041,054, filed Mar. 31, 2008, entitled "Serial Speech Recognition System for Bluetooth Headsets and the Connected Devices," naming Todd F. Mozer and Forrest S. Mozer as inventors.

BACKGROUND

The present invention relates to serial speech synthesis and recognition systems, and in particular, to a serial speech synthesis, speech recognition system or both for Bluetooth headsets and the like.

With the continuing development of large scale integration electronics and data storage technologies, consumer electronic products are getting smaller and smaller. At the same time, their computational capabilities are growing such that they are able to perform more and more functions in a smaller form factor. This smaller form factor and lighter weight allows the creation of nearly invisible electronic products that fit on a person's ear or onto their clothing. These developments make it more difficult for users to interact with electronic products because the number of buttons required in such smaller footprint products keeps growing and the size of required displays is becoming incompatible with the small size of the electronic products. Examples of this trend in increasing complexity are MP3 players and cellular phones like the iPhone, which have used improvements in tactile interfacing to activate and address the increasing feature set. Other small electronic products such as television remote controls have become covered in buttons and capabilities that are overwhelming to non-technical users. An example of products getting smaller is the Bluetooth headset that is worn in or near the ear and that communicates with nearby cell phones. Because the device is small, there is a limit to the number of buttons on it and there is no conventional keyboard with letters and numbers, making it difficult for the user to control the interaction. This forces the user to look at the Bluetooth headset in order to know which light emitting diodes are on, what color they are and what their flashing frequency is, or he must become adept at remembering codes and pushing small buttons in special sequences in order for the headset to know what commands he wishes to execute. This forces the user to revert to the cell phone handset itself, to which the headset is paired, for status and control. Unfortunately, forcing the user to refer to the handset somewhat defeats the purpose of the headset since it is desired that the headset sits comfortably and accessibly on the person, and the handset can be left nearby (for example in a purse, car seat, brief case, purse, trunk, packet etc.), but doesn't need to be removed frequently.

Therefore, there is a need for improving user interaction with electronic devices.

SUMMARY

Systems and methods for improving the interaction between a user and a small electronic device such as a Bluetooth headset are described.

In one embodiment, the present invention includes a wireless electronic device comprising a microphone for receiving a speech input, a speech recognizer coupled to the microphone to receive the speech input, a memory, the memory comprising a stored resource access number, and a wireless transceiver for sending information from the electronic device to one or more other electronic devices, wherein the speech recognizer is configured to recognize a first spoken command word, and wherein if the first command word is recognized in the speech input, then the speech recognizer generates a corresponding first command result, and wherein if the first command result matches a predefined criteria, then the electronic device automatically accesses the resource access number from memory and sends the resource access number and an externally executed command through said transmitter to a second electronic device, and wherein the externally executed command, when executed, uses the resource access number to establish a communication channel between said second electronic device and at least one remote device.

In one embodiment, the memory comprises a plurality of stored resource access numbers, wherein the speech recognizer is configured to recognize a plurality of spoken command words for accessing each stored resource access number, and wherein different resource access numbers access different nodes of a voice search engine search tree.

In one embodiment, the wireless transceiver is a Bluetooth transceiver.

In one embodiment, the present invention includes a method comprising receiving input speech from a user in an electronic device, recognizing the input speech on the electronic device, and outputting a command if the input speech is recognized as an utterance in a word set of a recognizer, accessing a resource access number stored in a memory of the electronic device if the command matches a predefined criteria, and sending the resource access number and an externally executed command to a second electronic device, wherein the externally executed command, when executed, instructs the second electronic device to use the resource access number to establish a communication channel between said second electronic device and at least one remote device.

In one embodiment, the at least one remote device comprises a voice search engine.

In one embodiment, the resource access number accesses a root node of the voice search engine.

In one embodiment, the memory comprises a plurality of stored resource access numbers, and wherein the word set of the recognizer is configured to recognize a plurality of utterances corresponding to the stored resource access numbers, and wherein a first resource access numbers is accessed if a corresponding first utterance is recognized and a second resource access numbers is access if a corresponding second utterance is recognized, and wherein different resource access numbers access different nodes of a voice search engine search tree.

In one embodiment, the resource access number and the externally executed command are sent to the second electronic device across a wireless network.

In one embodiment, the electronic device is a headset and the second electronic device comprises a cellular phone.

In one embodiment, the communication channel comprises a telephone network.

In one embodiment, the communication channel comprises a cellular phone network.

In one embodiment, the communication channel comprises an Internet.

In one embodiment, the communication channel comprises a wireless network.

In one embodiment, the resource access number is a telephone number.

In one embodiment, the resource access number is a URL.

In one embodiment, the present invention includes a wireless electronic device comprising a speech recognizer coupled to receive the speech input, a memory, the memory comprising one or more stored resource access numbers, a voice user interface for interacting with a user using speech recognition or speech synthesis, and a wireless transceiver for communicating with at least one remote device, wherein the remote device comprises a voice search engine. In this embodiment, the electronic device is configured to allow a user to interact with the electronic device primarily through the voice user interface and the speech recognizer is configured to recognize a first spoken command word, and wherein if the first command word is recognized in the speech input, then the speech recognizer generates a corresponding first command result. If the first command result matches a predefined criteria, then the electronic device automatically accesses the resource access number from memory and establishes a communication channel between said wireless electronic device and the at least one remote device, and, after establishing the communication channel, input speech from a user is transmitted to said voice search engine through said wireless electronic device.

In one embodiment, the resource access number is pre-stored (i.e., not input by a user). For example, an electronic device such as a Bluetooth headset may be configured with one or more pre-stored resource access numbers (e.g., at the factory), which may be stored in non-volatile memory, for example.

The use of a voice user interface for such devices will increase in importance because such small electronic devices are designed for use without looking at them and with minimal tactile interfacing (e.g. little use of keyboard or display). A reliable, large vocabulary or natural speech recognizer may be inconsistent with a small, inexpensive device. This limitation is overcome by employing speech synthesizers and recognizers in series where the small electronic device responds to simple audio commands and sends audio requests that require information at a remote site or more significant recognition analysis to one or more remote speech recognizers that handle such requests. Audio responses to the user via the small electronic device can be provided in the language of the user because such responses are produced in remote speech generators that can handle numerous languages. Similarly the user may speak commands in any language which are recognized by the appropriate language recognizer at a remote location. Pre-stored phone numbers, internet addresses, and the like are stored in the small electronic device to enable a user to reach certain locations, such as voice search engines, in an efficient manner. Embodiments of the present invention include systems and methods for utilizing speech synthesizers and recognizers in series to provide simple, reliable, and hands-free interfaces with users.

One embodiment of the present invention provides a user-friendly voice interface between the user and a small electronic device in which the electronic device can be simple, small and relatively inexpensive because the device does not require a keyboard, many buttons (e.g. >3), light emitting diodes, or a display screen. The small electronic device communicates with a user primarily through talking and listening, and thus it contains a microphone and a speaker. The microphone is used for acquiring the audio signal for recognition or for transferring the voice to other devices in its network. The speaker allows the user to hear communications from any of the products in the network or to hear speech from a telephone user connected into the system. The electronic device may be small and light enough to be worn like jewelry or to be embedded in clothing, shoes, a cap or helmet, or some other form of headgear or bodily apparel. It can also contain functions of a vehicle, a navigation device, a clock, a radio, a remote control such as used for controlling a television set, etc. A voice user interface and the use of speech synthesis and recognition is typically the primary means of interfacing with the device, and simple functions (e.g. on/off) or continuous control functions like up/down/scrolling may or may not be performed through button presses. Some of the users phrases can be sent from the small electronic device over a network to one or more remote speech synthesizers and/or recognizers that have a better ability (through recognition accuracy, database access, memory, MIPS, processing speed, etc.) than that which is available in the small, relatively inexpensive, electronic product. One embodiment of the present invention includes systems and methods for two or more speech synthesis and/or recognition devices to operate in series. A first synthesizer and recognizer, in a small electronic device, may provide both a first voice user interface and communication with the second, or third, etc., remote speech synthesizers and/or recognizers. In this document, the term "remote" refers to any electronic device that is not in physical contact with (or physically part of) the small electronic device. This communication may be, for example, through a Bluetooth interface, a cell phone network, the Internet, radio frequency (RF) waves, or any other wired or wireless network or some combination thereof or the like. Thus, the small electronic device associated with the first synthesizer and recognizer may contain a Bluetooth interface, a cell phone, an internet address, and the like.

In accordance with another embodiment of the present invention, a small electronic device is provided having no visible buttons or traditional keyboard or display, or even no buttons whatsoever, but having a voice user interface such that voice is the primary means of communication, command and control. The device may be awakened from a low power state by a signal from, for example, an accelerometer, a tilt indicator, an inductive or capacitive sensor, an audio signal, etc. after which it accepts and acts on simple audio commands by use of its internal speech synthesizer and recognizer. It may activate or communicate with one or more remote units and transmit more complex audio commands via a wired or wireless network to these other units. These one or more remote units may also contain speech synthesizers and/or recognizers and may seamlessly take over the user interaction. Transmitted audio commands may be interpreted and acted upon, with one action being setting a parameter, another being some form of signaling, dialing, or transaction, another being the transmitting of information back to the small electronic device which information is provided to the user via audio messages from a speech synthesizer or is used for a further dialogue between the small electronic device and the user. Another action may be a control function that activates a connection or changes a parameter.

In accordance with another embodiment of the present invention, a small electronic device with a voice user interface is provided with an input microphone, an output speaker, and one or a small number of buttons which are used for off-on operation of the device and other simple tasks such as turning on the internal speech recognizer that recognizes and acts on simple audio commands and that transmits other audio commands via a network to one or more remote units that it may have turned on with button presses or a tactile interface and that also may contain speech synthesizers and recognizers that analyze and act upon the more complex audio commands. Thus, the interaction between the user and the small electronic device is primarily through the voice user interface consisting of a speech synthesizer and recognizer, and not entailing a display monitor or keypad for entry, for example. One of the actions of the one or more remote units may be the transmitting of information back to the small electronic device via audio messages generated by the remote speech synthesizer, which information is provided to the user or used for a further dialogue between the small electronic device and the user. Other actions could entail redirecting the user to a new device which provides information verbally or continues the interaction with the user.

In accordance with another embodiment of the present invention, the small electronic device with a voice user interface and/or a remote second unit that is within hearing distance of the user are equipped with audio speakers and speech synthesis software such that one or both of such devices may receive and provide audio information which may be requests for further information or which may provide the status of the interaction or which may be a telephone conversation with a remote person.

In another embodiment of the present invention, the small electronic device with features described herein communicates with a first remote device such as a cellular phone, computer, gaming device, music player, personal navigation device, car, television, remote control, media player, visual monitor, or any other Bluetooth or wirelessly enabled personal electronic device, and sends it new words or phrases to be recognized, with such words or phrases sent on by the first remote device to a second remote device, which may be any of the above or a personal computer or a large computer in a server, for the second remote device to perform speech recognition analysis of the audio information and for said second device to either 1) send results of this analysis back to the first remote device, or 2) act on control information to make a connection, flip a switch or series of switches, adjust a potentiometer, or perform some other such control function, or 3) send the user to a third, fourth, or fifth remote device that performs the same types of functions as the second remote device described herein. The first remote device may act on information or data transferred to it and send it back to the small electronic device in order for the user to act on this information or perform other recognition related tasks based on the result.

In accordance with another embodiment of the present invention, the primary voice user interface based small electronic device may have several microphones or other sensors that are used to improve recognition performance by detecting and removing noise, by beam forming onto the desired voice signal, by echo suppression, by performing speech detection to determine the beginning and end of a speech wave train, etc. In this manner, recognition accuracy may be improved through improvements in the signal to noise ratio or in the recognizer's ability to know the start and end of the audio signal. These improved voice samples may be passed to the remote recognizers in order to enhance their performance in the recognition tasks. The primary small electronic device may also extract certain features of the input speech that are passed on to the remote devices in place of the audio.

In another embodiment of the present invention, the voice user interface based small electronic device can generate speech and play it back to the user to provide prompting information or feedback. The natural sounding voice output of the voice user interface may be recorded, digitized or compressed waveforms, or may be synthesized voices through text to speech algorithms. For purposes herein, the word "synthesis" is used to refer to any form of speech output whatsoever that is generated by an automated system such as a computer. Such natural sounding voices may be male, female or a special character, and they may provide speech in any of several languages such that the speech interface is familiar and seamless to the user. These synthesized voices may reside in the primary small electronic device, or any of the remote devices, which may pass speech parameters, voices, or dialogs back and forth among any of the serially connected devices with the goal of creating a seamless user interface with the same voice type whether connected to the primary device or any of the remote devices. Such speech may be used for responding to inquiries by the user, prompting the user, reading emails or calendar information, or providing instructions or information to the user such as announcing the incoming phone number or name of caller and asking the user if they would like to accept the call. Such information may also be provided to improve the recognition accuracy in the small electronic device by asking for clarification, or requesting that the user repeat the command. Likewise, other recognition devices in the network may send such audio feedback to the user through the small electronic device and its voice user interface.

Yet another embodiment of the present invention allows the user to talk in the language or his choice and for such speech to be recognized by remote recognition units that are capable of speech recognition in several languages. The primary and remote devices may work together to pass language information or common speech command information between each member of the network. For example, if the primary device has standard commands such as "go back," "cancel," or "what can I say," it may communicate these commands to its remotely connected devices so the interface can remain constant with a single language spoken. This communication can be done by sending speech recognition data or by accessing a lookup table of command structures.

Another embodiment of the present invention is that the small electronic device contains three buttons, 2 of which are used for up/down types of control. The voice user interface allows the user to select, by voice, the type of function that is controlled. For example, in a stereo Bluetooth headset used for music, the buttons may be remapped by voice commands to control volume, balance, tone, fast forward/rewind, or other functions, thus enabling two buttons to perform the functions of many. Although the small electronic device may contain a few such buttons, light emitting diodes, or a liquid crystal display, its primary interaction with the user is through speech synthesis and recognition.

A further embodiment of the present invention involves inclusion of pre-stored phone numbers, internet addresses and the like in the small electronic device such that the user may access information without having to remember the number or address of this information. For example, the user can say "voice search" into the small electronic device which recognizes the phrase and directly connects the user to a voice search engine using the pre-stored phone number or internet address of the voice search engine.

BRIEF DESCRIPTION OF THE DRAWINGS

A further understanding of the nature and advantages of the inventions may be realized by reference to the remaining portions of the specification and the attached drawings.

DETAILED DESCRIPTION

In the following description, for purposes of explanation, numerous examples and specific details are set forth in order to provide a thorough understanding of the various embodiments of the present invention. It will be evident, however, to one skilled in the art that different embodiments of the present invention may include some or all of the features in these examples alone or in combination with other features described below. In some embodiments, the present invention may be practiced without the specific details of some of the examples below or with equivalent arrangements of the techniques described herein. Accordingly, the drawings and description are to be regarded as illustrative in nature, and not as restrictive.

Figure 1:
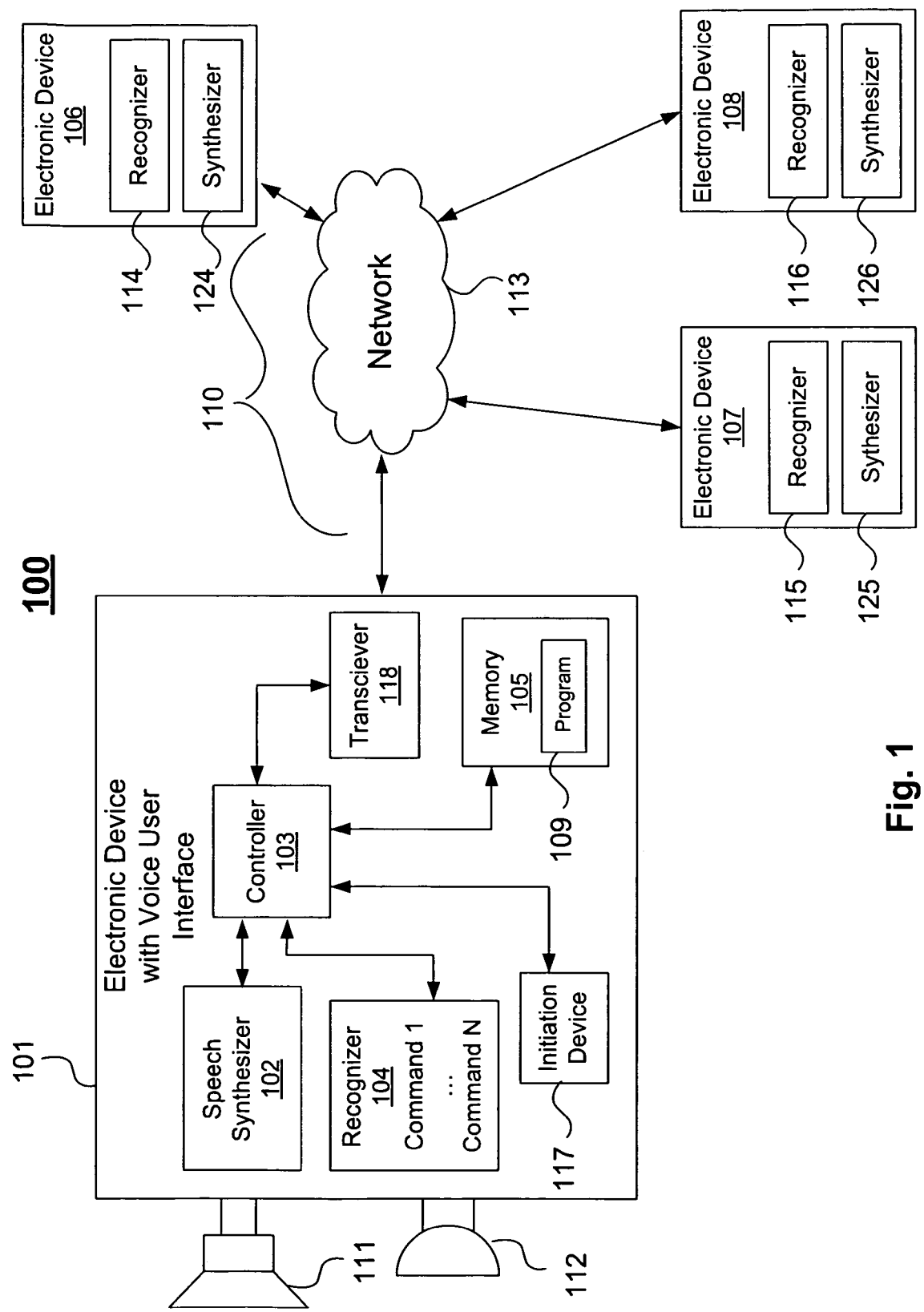
FIG. 1 illustrates a distributed recognition system according to one embodiment of the present invention.

FIG. 1 illustrates a distributed recognition system 100 according to one embodiment of the present invention. Distributed recognition system 100 includes an electronic device 101 having a voice user interface, remote electronic devices 106-108, and network 113. Electronic device 101 may include a speaker 111, microphone 112, speech synthesizer 102, controller 103, transceiver 118, memory 105, and an optional initiation device 117, for example. Each remote electronic device 106-108 may include a corresponding recognizer (114-116 respectively) and may further include a speech synthesizer (124-126 respectively). Each recognizer (104, 114-116) may have a different capability of recognizing speech. For example, recognizer 104 may have a different recognition set (e.g., a dozen words) while recognizer 114-116 may have a larger recognition sets and/or different speech recognition algorithms and functionality with much greater capability than the recognizer 104. Each recognizer or synthesizer, or both, may have different capabilities. In some embodiments, different recognizers may recognizer speech in different languages and for different types of voices and different synthesizers may have different capabilities in different languages and voices, for example.

Some embodiments of the present invention allow a user to interact with a small electronic device that may be too small to accommodate a number of buttons, keypads, a display, or LEDs. Using a voice user interface for an electronic device that is approximately less than about two (2) inches length and width and about one (1) inch or less in depth, where the voice user interface is configured to perform the majority of interface functions for the device, allows more functionality to be implemented in a device without requiring either smaller and smaller keypads and displays or complex interface button press sequences (e.g., pressing one button twice, another three times, while holding down buttons for different lengths of time to enter particular modes).

Voice user interface 101 receives speech at microphone 112. The speech may include utterances such as words or phrases, for example. In one embodiment, a user may initiate the voice user interface with an initiation request. For example, in one embodiment, voice user interface may be configured to listen for an initiation utterance (e.g., a single word or phrase in the recognition set such as "turn on", which activates the voice user interface when recognized). In another embodiment, the electronic device may include an initiation device 117 such as a button, a switch, or sensor, for example. Activating the initiation device 117 or recognizing an initiation utterance may signal controller 103 to have the recognizer 104 initiate the voice user interface and perform voice recognition. The electronic device may initially be in a low power mode, for example, and may transition from a low power mode to a normal power mode when the initiation process is performed.

During a voice user interface session, a user may speak to device 101, and the speech input may include one or more utterances (e.g., words or phrases) which may comprise a verbal request made by the user. The speech is converted into digital form and processed by recognizer 104. Recognizer 104 may be programmed with a recognition sets corresponding to commands to be performed by the voice interface (e.g., Command 1, ... Command N). In one embodiment, the initial recognition set includes only one utterance (i.e., the initiation word or phrase), and the recognition set is reconfigured with a new set of utterances corresponding to different commands after the initiation utterance is recognized. For example, recognizer 104 may include utterances in the recognition set to recognize commands such as "Turn Up Speaker", "Turn Down Speaker", "Establish Bluetooth Connnection", "Dial Mary", or "Search Restaurants". The recognizer 104 may recognize the user's input speech and output a command to execute the desired function. As described in more detail below, some commands may interact with recognizers in remote systems 106, 107, or 108 to perform additional speech recognition. Accordingly, a first utterance in the input speech may be recognized locally by the voice user interface to determine a command, and a second utterance in the input speech may be sent to a remote system for recognition with additional instructions generated in response to the recognized first utterance. The recognizer 102 may recognize an initial portion of the speech as a command. As another example, the user may speak an initiation word or push a button on electronic device 101 and then say "search Bob's Restaurant in Fremont". The button may be the initiation device 117, for example. The button press or recognized initiation word may signal controller 103. Controller 103 may be running a program 109, which may be loaded from memory 105, for example. Controller may be a microcontroller, microprocessor, or other form of digital controller, for example. If controller 103 receives an initiation signal, program 109 may load a new recognition set into recognizer 104 to recognize input utterances from the user corresponding to commands. For example, recognizer 104 may recognize the utterance "search" as one of the commands in the recognition set and notify the controller 103 that the command "search" has been recognized. Program 109 running on controller 103 may instruct the controller to send the remainder of the verbal request (i.e. "Bob's Restaurant in Fremont") to a remote electronic device 106 through transceiver 118 and communication medium 110. Electronic device 106 may utilize a more sophisticated recognizer 114 which may recognize the remainder of the request. Electronic device 106 may execute the request and return to the voice user interface data which may be converted to speech by speech synthesizer 102. The speech may comprise a result and/or a further prompt. For example, speaker 111 may output, "Bob's Restaurant is located at 122 Odessa Blvd. Would you like their phone number?"

In another embodiment, remote recognizer 114 may be utilized to recognize a portion of a request while recognizers 115 and 116 are utilized to recognize other portions of the request. For example, electronic device 106 may have access to a database of city names and locations, while electronic device 107 and 108 may have access to databases concerning business or residential addresses. In another embodiment, recognizer 114 may be utilized as a first step and further recognition may be serially executed on recognizer 115 and then on recognizer 116. For example, in some applications most user speech requests may be recognized utilizing a specialized recognition set accessible to recognizer 114 which may utilize a fast recognition algorithm. If the remaining portion of the verbal request fails to recognize the speech (e.g., within a tolerance threshold), the task may be forwarded to electronic device 107 which utilizes recognizer 115 which may employ a different (e.g., more rigorous) algorithm. Recognizer 116 of electronic device 108 may be a very computationally intensive algorithm which requires much faster processing or parallel processing, for example. The distributed recognition process may further utilize electronic device 108 and corresponding recognizer 116 depending on the specific command received by electronic device 101 and/or the recognition task to be performed by the remote systems.

In another embodiment, the remainder of the verbal request may be sent to all of the electronic devices 106-108. Each of the respective recognizers 114-116 may employ a different algorithm for speech recognition and this may allow for a faster recognition given a large variation of speech from a wide variety of users. Or the results from the multiple and different recognizers may be combined in a polling algorithm to determine the most likely result.

In one example application, embodiments of the present invention may be used to recognize different languages. For example, recognizer 104 may be configured with a recognition set comprising different languages. For instance, the words in the recognition set may be "English", "Français," and "Espanol." These words corresponding to different languages may be used to determine the desired language to be used by the voice user interface. A user may speak the work "English." The recognizer will recognize the input speech because "English" is a word in the recognizer's recognition set. In response to a positive recognition, the recognizer may output a command indicating that English is the desired language. Different remote systems may be configured to perform speech processing in different languages. Accordingly, the command is used to determine the remote system that is to be used to perform the speech processing. For example, in one embodiment, the command may be sent to a remote server and the server may use the command to select a remote device that includes an English speech recognition system (or French or Spanish). In another embodiment, the electronic device may store information to identify the appropriate remote system locally. For instance, different recognition results corresponding to different language choices may be used to access pre-stored access information (e.g., URLs) for different remote systems that recognize different languages. Thus, if the recognition result corresponds to "Francais," then the recognition result may be used to access information for a first remote system that is configured to process French speech, and if the if the recognition result corresponds to "English," then the recognition result may be used to access information for a second remote system that is configured to process English speech. Once a communication channel is established between the device and the appropriate remote system, the user may enter speech into the device and the speech may be sent to the selected remote system to implement voice user interaction, including speech recognition or speech synthesis, or both.

Electronic device 101 may be a wireless enabled device and connection 110 may be the wireless connection to an electronic device within network 113. Network 113 may be comprised of a wireless network, a wired network, or a combination of both. Network 113 may include electronic devices 106-108. Network 113 may be comprised of a personal area network coupled to a wide area network, for example.

Figure 2:
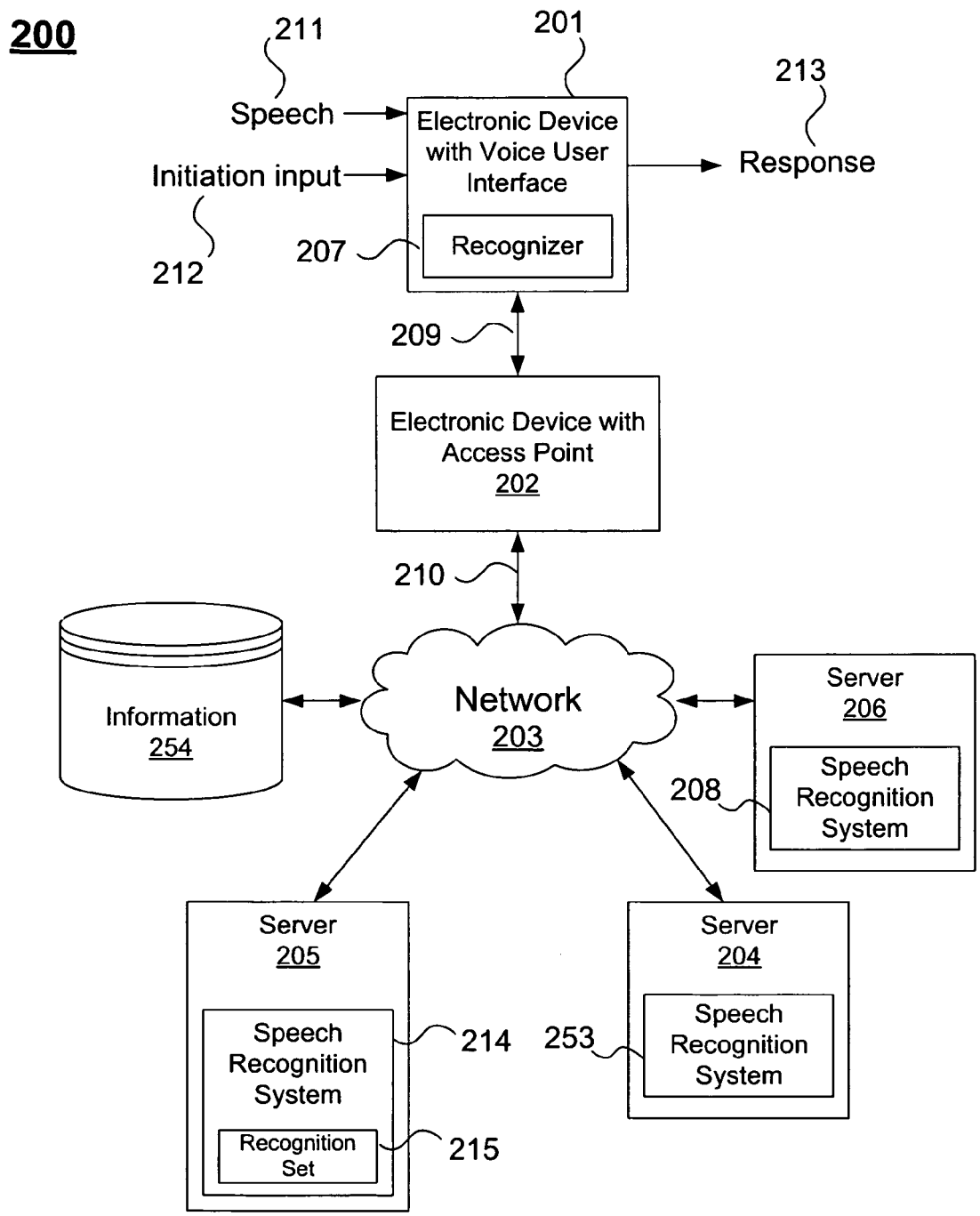
FIG. 2 illustrates a distributed speech recognition system according to another embodiment of the present invention.

FIG. 2 illustrates a distributed speech recognition system 200 according to another embodiment of the present invention. Distributed speech recognition system 200 includes an electronic device 201 with a voice user interface, electronic device 202 with a network access point, network 203, and servers 204-206. The voice user interface in electronic device 201 may function in a similar manner to voice user interface of FIG. 1 described above. A user may use the voice user interface in electronic device 201 to form a communication connection 209 with the access point 202. The access point 202 may form a communication connection to a network 203. Network 203 may be a wired or wireless local or wide area network such as the Internet, for example. Network 203 may have communication connections to remote computer systems such as servers 204, 205, and 206. One or more remote systems may include additional speech recognition systems such as recognition system 208 on server 206, recognition system 214 on server 205, and recognition system 253 on server 204. Distributed speech recognition system 200 improves speech recognition for the user by distributing the recognition process across multiple systems each of which may be tailored for different specific speech recognition tasks or different languages or different voices, for example.

For example, electronic device 201 may receive initiation input 212 such as a button push to begin speech recognition. Alternately, initiation input 212 may be a speech keyword such as "initiate", for example. The voice user interface on electronic device 201 may use the initiation input to begin a voice user interface speech processing session. Next, a user may input speech into the voice user interface, and local recognizer 207 may begin to recognize the utterances. The voice user interface may receive the input speech and determine if the first portion of the input speech corresponds to one of the utterances in the recognition set. For example, the user may speak the following:

"search for English Beat's most popular songs."

If the first portion of the spoken utterance is in the recognition set of recognizer 207, then the recognizer will recognize the first portion of the input utterance (e.g., here, the word "search"). The recognizer may produce a positive output, which is interpreted as a command. The command may then be executed on device 201. Accordingly, voice user interface automatically determines that the first portion of the user's input speech is a command, and the other portions of the input speech may be operated on remotely, for example. Next, the voice user interface on electronic device 201 may send other portions of the speech to remote recognizers through the access point 202, for example. Using the example speech input above, the voice user interface may recognize "search" as the command and initiate a voice search process. The voice search process may include sending the other portions of the input speech to one or more remote recognition systems for processing.

The access point 202 may allow device 201 to access network 203. For example, as described in more detail below, device 201 may be a Bluetooth headset or part of a hands free car kit, for example, and device 202 may be a communication system (e.g., a cellular phone) with cellular or WiFi (e.g., 802.11) networking capability. In this example, connection 209 may be a Bluetooth wireless connection and connection 210 may be a cellular or 802.11 wireless connection. Access point 202 may convert the speech from device 201 into a different protocol and pass the speech to one or more servers through network 203. Device 202 may also control which servers are used to process the speech, although this control information may be included as part of the program running in device 201 and device 202 is merely acting as a gateway. In either case, the speech is formatted to be sent over the network and additional information is generated including:

<Target URL>—the Universal Resource Locator (URL) or Web Address of the Destination Server.
<Server Instructions>—Optional commands for the server to indicate that the server is receiving speech to be processed and instructions on how to process the payload.
<Source Information>—Information used to determine where to send the results.

Accordingly, the remote systems may receive a command and one or more spoken utterances over the network. As described above the server instructions may be options. In one embodiment, a dedicated server may automatically be configured to receive preformatted speech data, and the server automatically performs speech recognition on the input payload. In other embodiments, the speech data may be sent with parameters that are used by the server in processing the speech. Example parameters include information on the beginning and end of the utterance, information on the background noise level, information accumulated from a number of microphones in electronic device 201, etc.

The command and the spoken utterances mentioned above may be sent to server 205, for example, which may process the speech input by the user. The server 205 may read the command and perform speech recognition on the received speech using recognizer 214, which may be programmed with a recognition set 215, for example. In some embodiments, one server may be a primary recognition system and other servers may be secondary recognition systems for performing recognition under the coordination of the primary system. For example, some or all of the speech received by server 205 may be forwarded to servers 204 or 206 for further recognition using speech recognition systems 253 or 208, respectively. Speech recognition system 208 may recognize the remaining portion of the request and communicate the results of the recognition back to the server 205. For instance, server 205 may receive the speech and command over network 203 and determine that server 208 is suitable for performing the recognition. For example, using the example input speech above, server 205 may recognize portions of the received speech, such as the words "most popular song", and server 205 may send the remaining part of the utterance to server 208 if server 208 is programmed with information (e.g., word sets) regarding songs and musical artists. Server 208 may recognize "English Beat" and return the search results to server 205. Server 205 may then generate a query to database 254 for songs by English Beat that have a high popularity ranking.

The search on database 254 may result in a list of five songs which were most popular for the musical group English Beat. This information may be communicated back to the user through voice user interface on electronic device 201 via network 203, connection 210, access point 202, and connection 209. The results may be used to synthesize a voice response from the voice user interface. For example, the voice user interface may output the following synthesized speech received from the remote server 205:

"The most popular songs for the English Beat are Doors of Your Heart, Hit It, Save It for Later, Jeanette, and I Confess. Would you like to listen to one of these songs?"

The user may say "repeat" in response to the synthesized speech and recognizer 207 may recognize the word "repeat" if this word is in the recognition set for the voice user interface. If "repeat" is recognized, electronic device 201 repeats the synthesized speech. The user may also say "Yes, play Save It for Later". The word "yes" may be recognized by recognizer 207 and the voice user interface may send the remaining portion of the request to the server access point 205 to utilize speech recognition software 208 to recognize the user's command to access and play the song.

In another embodiment, the connection between the access point 202 and the servers may be a voice connection utilizing voice over internet protocol (VOIP), for example. In one embodiment, a portion of the second input utterance (the response) from the user may be processed on server 205 using voice recognition system 214. In this embodiment, voice recognition system 214 may have a recognition set 215 based on the question generated and therefore may be much faster at recognizing the speech request. For example, recognizer 207 may recognize "yes" and then forward the remaining portion of the response to the server 205 to recognize the remaining speech. Server 205 may have loaded a recognition set 215 with the list of songs retrieved in response to the initial response (i.e. "Doors of Your Heart, Hit It, Save It for Later, Jeanette, and I Confess") and may therefore be able to recognize the request much faster. For FIG. 2, an example access point may be a cellular phone, for example. However, it is to be understood that small electronic devices primarily using a voice user interface may include cellular phones where the primary interface is a voice user interface.

Figure 3:
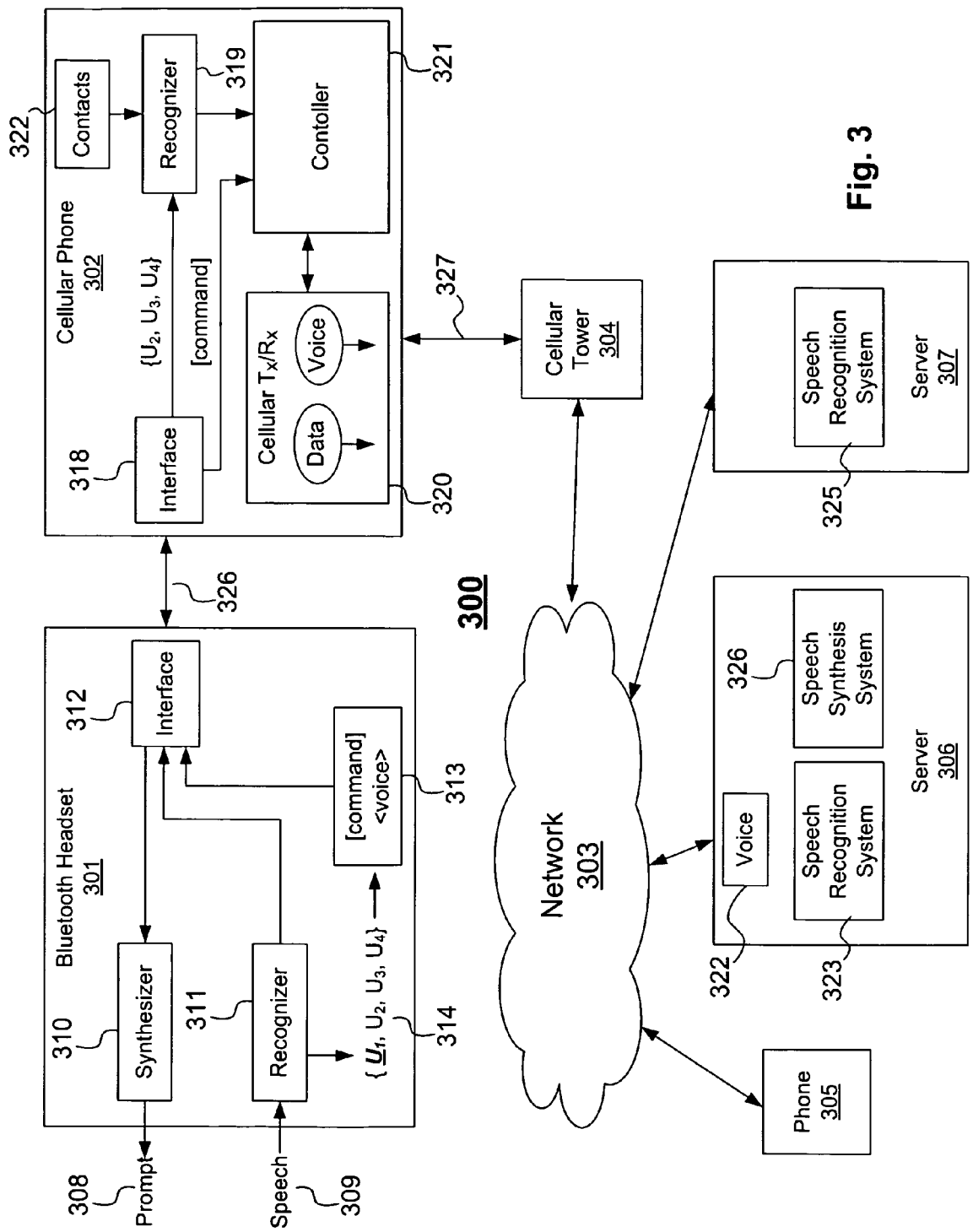
FIG. 3 illustrates a speech recognition system according to another embodiment of the present invention.

FIG. 3 illustrates a speech recognition system 300 according to another embodiment of the present invention. Distributed speech recognition system 300 includes Bluetooth headset 301, cellular phone 302, cellular tower 304, network 303, server 306, and server 307. The Bluetooth headset 301 provides "hands free" operation of the cellular phone 302, and allows for the user to perform distributed speech recognition. The Bluetooth headset 301 provides a normal mode in which a user may carry on a phone conversation with another user utilizing phone 305. This conversation may utilize the cellular phone in a conventional manner. However, Bluetooth headset 301 also provides a voice user interface for interacting with the headset and other portions of the distributed speech recognition system using speech. The Bluetooth headset 301 includes a synthesizer 310, interface 312, recognizer 311, and command initiator 313. A user may provide a request in the form of speech 309. The request may include several utterances (e.g. $\{U_1, U_2, U_3, U_4\}$ illustrates a set of utterances). Speech 309 may include a request that contains a command word such as "call", for example. Recognizer 311 may be configured with a recognition set that includes a plurality of utterances (e.g., words or phrases) that correspond to commands as described above. If the word "call" is in the recognition set, recognizer 311 may recognize the first utterance $\overline{U_1}$ as the spoken word "call" and generate a recognition result indicating that one of the commands (e.g., "call") has been recognized. The recognition result is sent to command initiator 313. Command initiator 313 may translate the recognition result for $U_2$ to a corresponding command and communicate the command and the remaining portion of the request (i.e. $\{U_2, U_3, U_4\}$) to a controller for sending to other electronic devices within the distributed speech recognition system 300. For example, the user may input the following speech:

"call John Smith cell".

Recognizer 311 may recognize "call" as a command and command initiator 313 may send a corresponding command and the remaining portion of the request to interface 312.

[Call command]+<"John Smith cell">

The example "Call command" above may be an instruction to the cellular phone 302 to initiate a call, for example. Interface 312 may convert the command and voice data into packets in order to transmit the information wirelessly to the cellular phone 302 using the Bluetooth protocol. While a call is illustrated here as an example, it is to be understood that a variety of commands may be generated by configuring the recognizer with a recognition set including a plurality of words or phrases corresponding to commands, which may be executed on remote systems. Embodiments of the present invention may translate a recognition result indicating that one of the words or phrases in the recognition set has been recognized into a corresponding command, and send the command and other speech input to a remote system for recognition.

Cellular phone 302 includes interface 318, cellular transmitter and receiver circuitry ($T_X/R_X$) 320, recognizer 319, contact information 322, and controller 321. In this example the interface 318 is a Bluetooth interface, however, other wired or wireless interfaces could be used in other implementations. Interface 318 may receive the request in the example above (i.e. [Call command]+<"John Smith cell">). The command portion of the request may be sent to controller 321. In one embodiment, the remaining utterances ("John Smith cell") may be sent to a recognizer 319 on the cellular phone. Recognizer 319 may be optional for cellular phone 302. Recognizer 319 may be used to recognize the utterances in the context of contact information 322 stored within the cellular phone 302. For example, recognizer 319 may be configured with a recognition set using names from contacts 322. If "John Smith" is included in the recognition set of recognizer 319, then the system may access the telephone number of John Smith from the contact information 322. Additionally, the recognition set may include "cell", "home", and "office", for example. In this case, the word "cell" may also be recognized, and the cellular telephone number for John Smith may be accessed from a contact record for John Smith. In this example embodiment, the controller may execute the command received from headset 301 (i.e., "call"), which causes the cellular phone 302 to initiate a call. The telephone number for the call in this case is the "cell" number from the contact record for John Smith. Accordingly, the phone will automatically initiate a call to a specified contact in response to the user's input speech. The call may be made in this example through cellular tower 304 and through network 303 to a phone 305. Accordingly, network may include a plain old telephone system (POTS) network, for example. It is to be understood that a variety of other commands may be performed based on a user's inputs speech using the above described technique.

In another embodiment, the remaining utterances in the example above ("John Smith cell") may be processed by a recognizer 325 on a remote system 307. For example, controller 321 may send the remaining utterances to cellular Tx/Rx block 320, through cellular network 327 and network 303 (e.g., the Internet) to server 307. Server 307 may include a speech recognition system 325, which may be configured to recognize contact information for the user, for example. Similar to the case above, recognizer 325 on server 307 may recognize "John Smith" as the name and "cell" as the telephone number type, and return data corresponding to the result (e.g., Name=John Smith and TNumType=Cell) to cellular phone 302. In this case, the returned data may be used to retrieve the telephone number from the contacts 322. Alternatively, contact data may be accessible to the server, and the server may return the cellular telephone number for John Smith. In either case, the cellular phone may execute the command received from the headset 301 to initiate a call to the recognized telephone number.

In another embodiment the Bluetooth device may open up a voice channel to a remote server. The voice channel may be a telephone connection or a voice over internet protocol connection, for example. The Bluetooth device provides a voice user interface for services provided on server 306. In this embodiment cellular phone 302 may provide a voice channel to a remote resource such as server 306. For example, a user may say, "Voice search", and recognizer 311 may recognize "Voice search" as a command to dial a specific number. Command initiator 313 may send a command to dial a phone number associated with the speech "Voice search". Interface 312 may convert the command into packets in order to transmit the information wirelessly using the Bluetooth protocol. The command may be received by interface 318 of cellular phone 302. The command may be sent to controller 321 to be executed and the command may instruct Tx/Rx 320 to open up a voice channel to server 306. The voice channel may be implemented over the cellular network 327 and network 303, for example, and may include a cellular protocol and Voice Over Internet Protocol ("VOIP"). In other embodiments, the voice channel may be implemented over a POTS network, for example. Once the voice channel to server 306 is established, the server 306 may invoke speech synthesis system 326 to generate speech and send the speech back to Bluetooth headset 301. The prompt may say, "Voice connection ready".

Alternatively, controller 321 on cell phone 302 may generate data that may be sent to headset 301 translated into a voice prompt by synthesizer 310. Once the channel is established, the user may now speak a voice search request. For example, the user may say, "Today's Giant's game results".

The spoken voice search request is received in the headset 301, coupled through the Bluetooth network 326 to cell phone 302, and through cellular network 327 and network 303 to server 306. Server 306 may include a voice receiver module to receive voice search requests (i.e., speech) and forward the voice information to a recognition system 323. The voice search request may be recognized by server 306 speech recognition system 323. Speech recognition system 323 may utilize several processes running on multiple computers in order to recognize the request as described above. Server 306 may also utilize speech synthesis system 326 to generate a response to the request. For example, if the above example voice search is recognized, software running on the server may receive the recognition result and trigger speech synthesis system 326 may generate an output such as "Game started at 6 pm; Giants 4, Dodgers 3, end of the $4^{th}$ inning. Would you like to listen to the game or receive periodic updates?"

The user may maintain a voice connection with the server and may utilize a larger selection of choices and options. If the user chose to listen to the game, the server 306 may begin sending audio from a radio station internet site which is providing coverage of the game over the internet. If the user chose to receive periodic updates, the server 306 may prompt the user if the user wishes to receive text message updates or audio updates. If the user chooses audio updates, the server 306 may indicate to the user that the site will hang up and periodically call the user at the end of each inning to give an update or the server may call every 10 minutes with an update on the game.

The contacts 323 may also contain numbers, characters, or a combination of numbers of characters which make a connection to a variety of locations accessible by the network. For example, the user may say "stock update" and the command initiator 313 may contact an internet address which has a voice recognition program and voice interface for the user to listen to stock market information such as stock quotes and securities performance, for example. The server 306 may also have a barge-in feature on the voice interface which would allow the user to interrupt the voice synthesis in order to provide another request.

Figure 4:
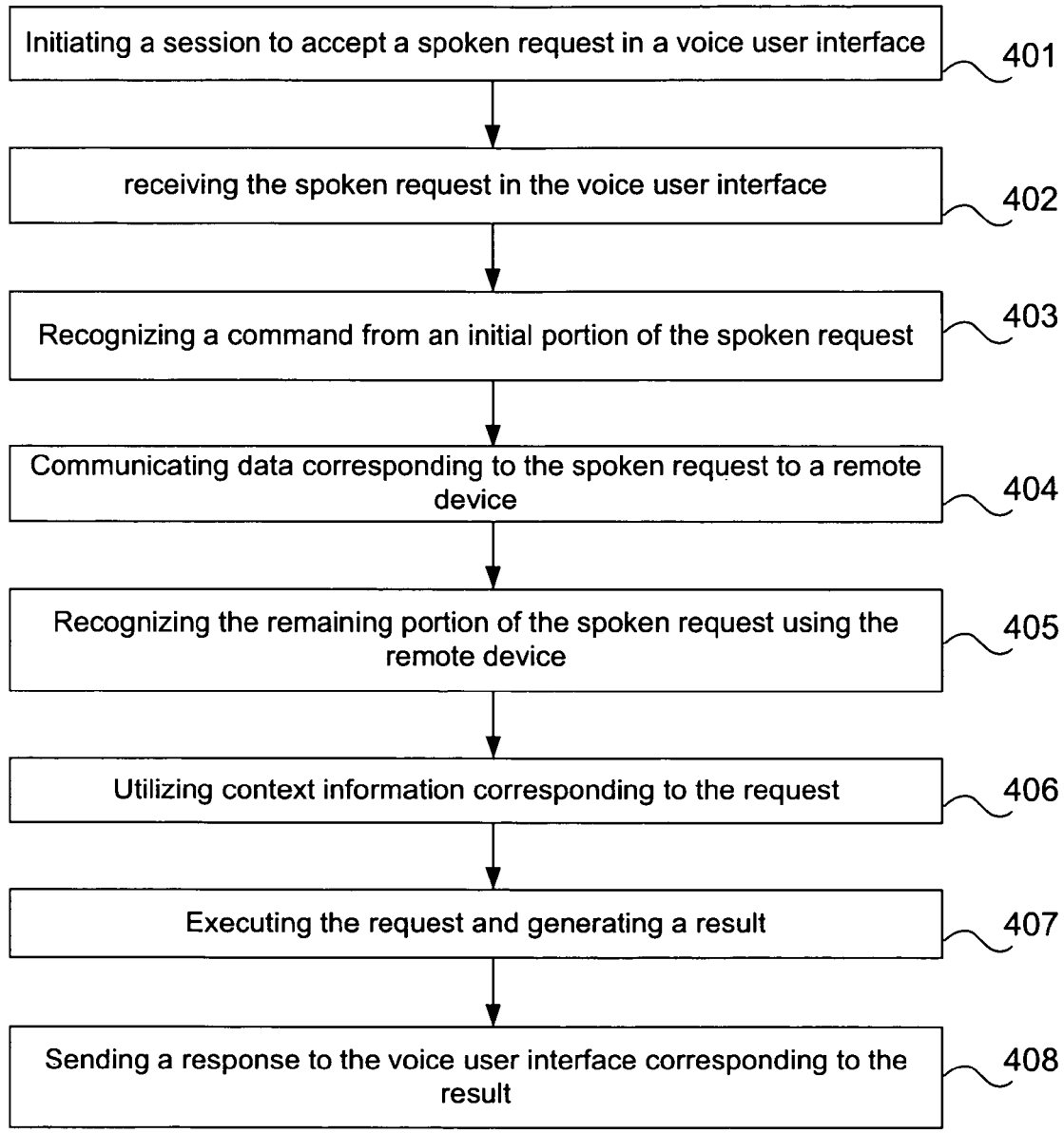
FIG. 4 illustrates a method according to another embodiment of the present invention.

FIG. 4 illustrates a method 400 according to another embodiment of the present invention. At 401, a session to accept a request is initiated on a voice user interface. A voice user interface may be implemented on hands free headset, a personal digital assistant (PDA), or even a laptop computer or a variety of other small electronic devices, which in some examples may have limited surface area for traditional user interfaces such as keyboards and/or a mouse. An electronic device with a voice user interface may include a microphone, an amplifier, and an analog to digital converter to convert the audible sounds to digital signals. The session may be initiated by a speaking a keyword or phrase such as "turn on" or other audio signal, for example. A switch, button, tactile sensor, motion detector, position detector, or a combination thereof, may initiate a session. The voice user interface may be awakened from a low power state by a signal originating from a capacitive sensor or an inductive sensor, for example.

At 402, the voice user interface receives the request in the form of a speech input. The speech input may be comprised by a plurality of utterance, which may include one or more words or phrases. The plurality of utterances may correspond to a command and a parameter of that command, for example.

At 403, a command is recognized from an initial portion of the input speech. The command may be recognized using a recognition set loaded into a speech recognizer that implements the voice user interface. The recognition set may be hard coded into the recognizer, uploaded from another electronic device during power up or during a pairing process between an electronic device having the voice user interface and the other electronic device, for example. In one embodiment, a headset may pair with a cellular phone over a wireless network and upload a recognition set from the cellular phone.

At 404, a message corresponding to a spoken request is sent to a remote device. The remote device may be accessible through a wired network, a wireless network, or both. The message may include the command or a command or other instruction corresponding to the original command which was recognized. For example, if a recognizer outputs a recognition result indicating that one of the commands in the recognition set was recognized, then the recognition result may, in turn, be used to access and send particular instruction to the remote device. Alternatively, the recognition result indicating that the command was recognized may be sent to the remote device and used to carry out the desire function. The message may further include the entire spoken request or a portion of the spoken request. For example, the message may include a code corresponding to the command and the remaining portion of the request (i.e. without the portion of the spoken request that was recognized as a command). Alternatively, the entire spoken request may be sent to the remote device. The message may further include information related to the request. For example, the request may include an identification of the user, an identification of the electronic device, or other information to be used by the remote device.

Embodiments of the present invention may use one or more remote devices that may be accessible through multiple networks. For example, the voice user interface may be integrated into a Bluetooth headset that communicates with a cellular phone or laptop computer using a Bluetooth protocol. In this example, one remote device may be the cellular phone or the laptop computer. In one embodiment, one remote device may use a second wireless protocol such as WiFi in order to connect to a second network such as the Internet.

In one embodiment, a cellular phone may use the cellular network to connect to the Internet.

In another embodiment, a laptop computer may use an 802.11 network to connect to the Internet. In these embodiments, the second remote device may be a server accessible over the Internet, for example.

At 405, the remaining portion of the request is recognized using the remote device. The remote device may be a cell phone or server as mentioned above. For example, a server may have access to a large amount of computational power and memory to implement a more sophisticated recognition algorithm than the cell phone or a Bluetooth headset. Accordingly, the command may instruct the phone to establish a call with the server, and the server may be used to process the remaining portion of the spoken request. Alternatively, the command may instruct the cell phone to use a local recognizer to process the remaining portion of the spoken request.

At 406, context information corresponding to the spoken request is utilized. Context information corresponding to the input speech may include the location of the user when speaking, for example. In one embodiment, position information retrieved from a Global Positioning System ("GPS") located in the electronic device or in a remote system that is near the user. For example, a headset may have a connection to a cellular phone through a personal area network, such as Bluetooth, and the cellular phone may include positioning functionality. In this example, the cellular phone may use the position information during recognition (i.e., on the cell phone) or the cell phone may send the position of the user to another remote device for use during recognition.

Other context information may be the identification of the user or identification of the electronic device. A remote device may use this information to access personal preferences, history, or other personal information located in a database, for example, or location accessible to the remote device in order to optimize the voice recognition process. The preferences may also include preferred voice synthesis settings. For example, a particular voice may be used in communicating with the user. This may allow verification that the remote site has accessed the correct personal information and may help the user to have a consistent interface with the voice user interface.

At 407 the recognized spoken request is executed. For example, the spoken request may correspond to a bank or stock transaction. In this case, the spoken request may be recognized and the transaction may be executed via the Internet. In one embodiment, the recognized spoken request may utilize additional information such as place, time, or personal information. Personal information may be used as identification, for example. Alternately the server may be part of a secure network of computers and the transaction may occur on the secure network. Another example is a spoken request for information. In this example, the execution of the spoken request may include finding the information corresponding to the request. A user may request a weather report or a stock quote and the remote server may retrieve the information from a database or group of databases after recognizing the spoken request as described above. Accordingly, execution of different recognized spoken requests may generate a variety of different results.

At 408, a response corresponding to the result is sent to the voice user interface. In one embodiment, the remote system receives the results of the transaction and generates synthesized audio corresponding to the result. For example, the response may be a synthesized voice stating, "stock trade executed" or "transfer of $100 to checking completed." The response may also be list of different options. For example, the response may be data corresponding to a voice synthesized at the voice user interface which states, "Do you wish to call John Bosley Junior or John Bosley Senior?" If recognition falls below a confidence threshold, the response may be a prompt for clarification. The response may also be an indication that the request has been executed. For example the response may be a voice stating, "Your musical selection, Let It Be by the Beatles will begin in a moment."

Figure 5A:
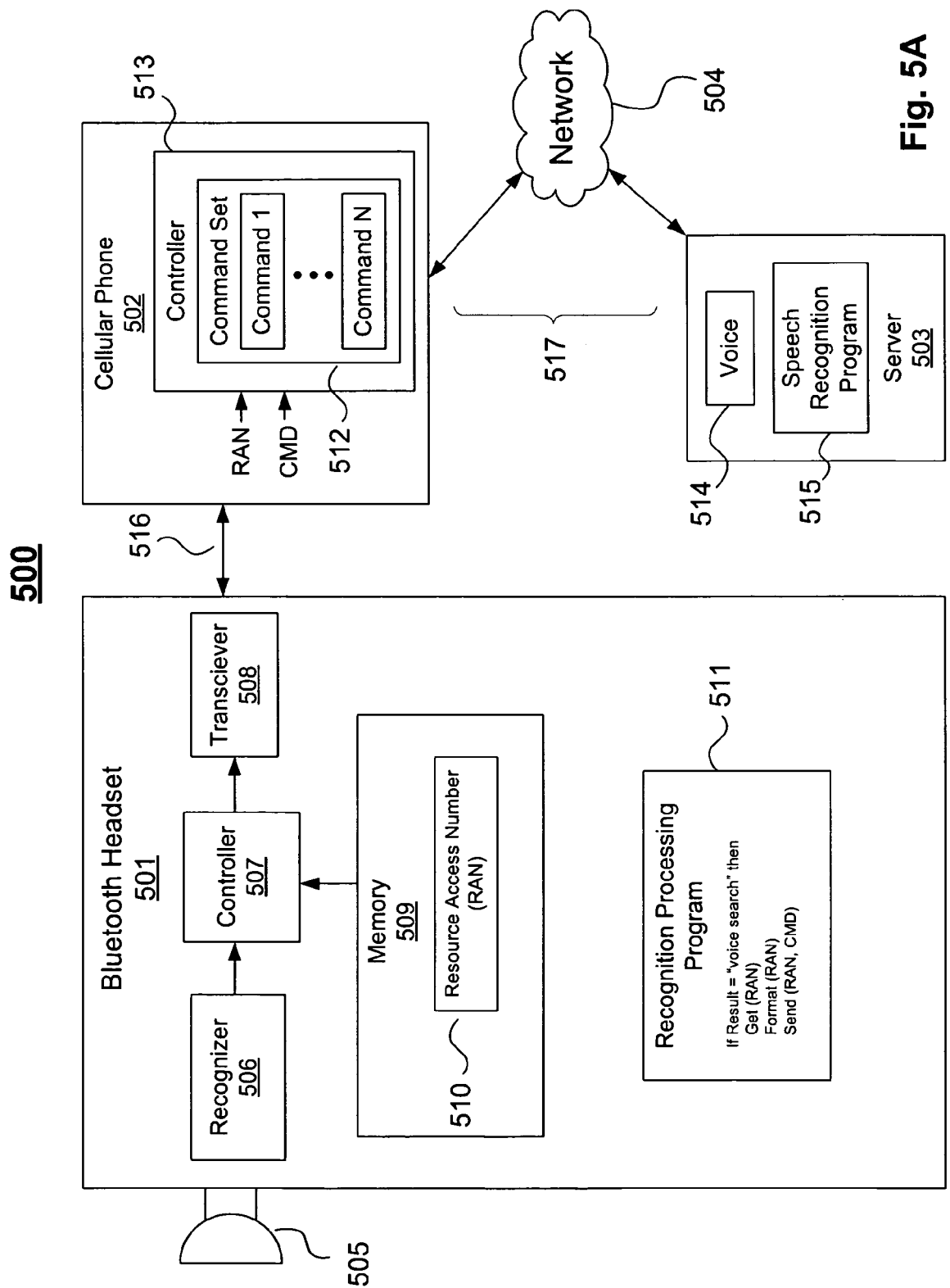
FIG. 5A illustrates a recognition system according to another embodiment of the present invention.

FIG. 5 illustrates a recognition system 500 according to another embodiment of the present invention. Recognition system 500 includes Bluetooth headset 501, cellular phone 502, network 504, server 503. The Bluetooth headset 501 includes microphone 505, recognizer 506, controller 507, transceiver 508, recognition processing program 511, and memory 509.

In one embodiment, the user may speak a specific word or phrase such as "voice search", for example. "Voice search" may be converted into digital data and processed by recognizer 506. Recognizer 506 may have a recognition set including the phrase "voice search", and recognizer may recognize the spoken phrase. The output of the recognizer is an indication that the command "voice search" in the recognition set was recognized. This result may be coupled to controller 507. In another embodiment, controller 507 implements the recognition process as software, for example. It is to be understood that a recognizer may be implemented as hardware, software, or as a combination of hardware and software. Recognition processing program 511 may receive the recognition result indicating that the command "voice search" was recognized. If the command "voice search" is recognized, program 511 may access the resource access number from memory and send the resource access number to the cell phone. A resource access number may be a telephone number for a voice search system, for example. Alternatively, the resource access number may be a Universal Resource Locator (URL) for a voice search system. The resource access number 510 may be a digital code which may correspond to a telephone number, an internet address, or used to look up information on how to access the resource to be used in the voice search process described below. In one embodiment, if the recognition result is "voice search", then program 511 may get the RAN from a stored location in memory 510, format the RAN into a packet for sending over a wireless network, and send the RAN across the network with a command. Formatting the RAN may include configuring the RAN into a wireless protocol, such as the Bluetooth protocol, for transmission. Program 511 may further access a command and format the command for transmission with the RAN. The RAN and command are then sent to transceiver 508 and across network 516 to cell phone 502.

The RAN and command are received from headset 501 in cell phone 502. The cellular phone 502 includes controller 513, which may include a command set 512. The command "CMD" may be one of the commands within the command set 512. Accordingly, when the command from the headset is received, it may invoke one of the commands in the cell phone controller. In this example, the command from the headset may correspond to a command to instruct cellular phone 502 to make a communication coupling 517 to server 503 through network 504 using the RAN. For instance, if the RAN is a telephone number, the command may cause the cell phone to automatically call a specific telephone number, which may be the access number for a voice search engine. If the RAN is an Internet address, the command may cause the cell phone to automatically establish an Internet connection to a remote server on the Internet, which may include a voice search engine.

Server 503 includes voice interface 514 and speech recognition program 515 which illustrate one embodiment of how a resource may provide a user with access to services using primarily speech. Voice interface may be voice interface through a POTS system or a Voice Over Internet Protocol (VOIP) interface to the Internet, for example. When a connection between the phone and the server is established, the user may be prompted by the server to input the further information. This voice may be generated from the server 503 and sent to a speaker (not shown) on the Bluetooth headset 501, for example. The prompt may say, "What would you like to search for?"
The user may then speak one or more search parameters. For example, the user may be in a shopping center and may respond, "What is the current price for prime rib at Sam's market?"
The user may be comparison shopping without going between shopping centers and may wish to know if the price of a product the user is currently looking at "Trendy Market" is a fair market price.

The user's speech input may be sent to the server 503, and the server may utilize speech recognition program 515 to recognize the speech. The program may utilize one or more processors accessible to the server access point 503 and may utilize serial or parallel processing, for example.

Figure 5B:
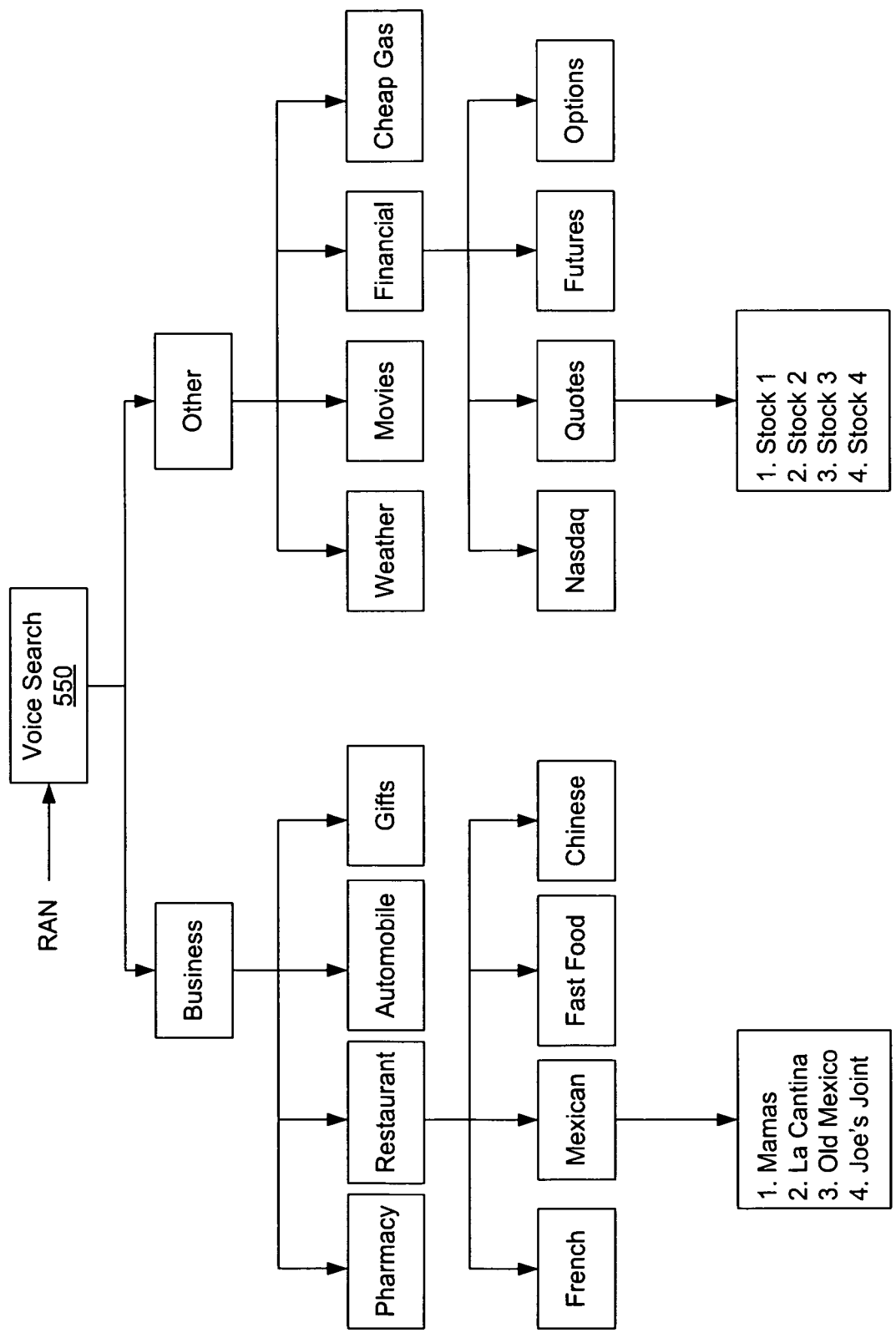
FIG. 5B illustrates a search tree that is accessed to obtain information.

The remote resource may provide a variety of options for users through voice interaction. FIG. 5B illustrates a search tree that is accessed to obtain information. For example, the remote system may provide voice access to information, voice control over a remote process such as a financial transactions, voice access to media such audio or video, including of entertainment events, or a combination of the above, for example. The resource may provide a manipulation of data and resources in order to respond to a request from the user.

For example, the resource (e.g. server 503) may execute an Internet search as part of executing the user's spoken request. In this example, the RAN accesses a root node or entry point in the voice search system 550. From here, a user may be presented with synthesized voice prompts to access a variety of resources. The system may support a general search feature where a user may enter any voice search request and the system will attempt to recognize and search for the request. In this example, the search system may be configured in a tree structure. At the root level, a user may be presented with synthesized voice options associated with the root level. For example, the system may synthesize "Search for Business, World Events, Other, etc. If the user speaks the word "Business", the system may recognize the user's input and move to the next level. At the level under business, the system may synthesize "Pharmacy", Restaurant", "Automobile", and "Gifts", for example. The system may also load a new recognition set into the recognizer to recognize the new choices. Similarly, a user may select different options and move through the search tree structure to obtain the desire information. For example, using the voice system in FIG. 5B, the user may select information about "La Cantina" Mexican Restaurant or a particular stock. It is to be understood that the resources accessed in response to the voice search may be on multiple servers or databases across the network.

Figure 6:
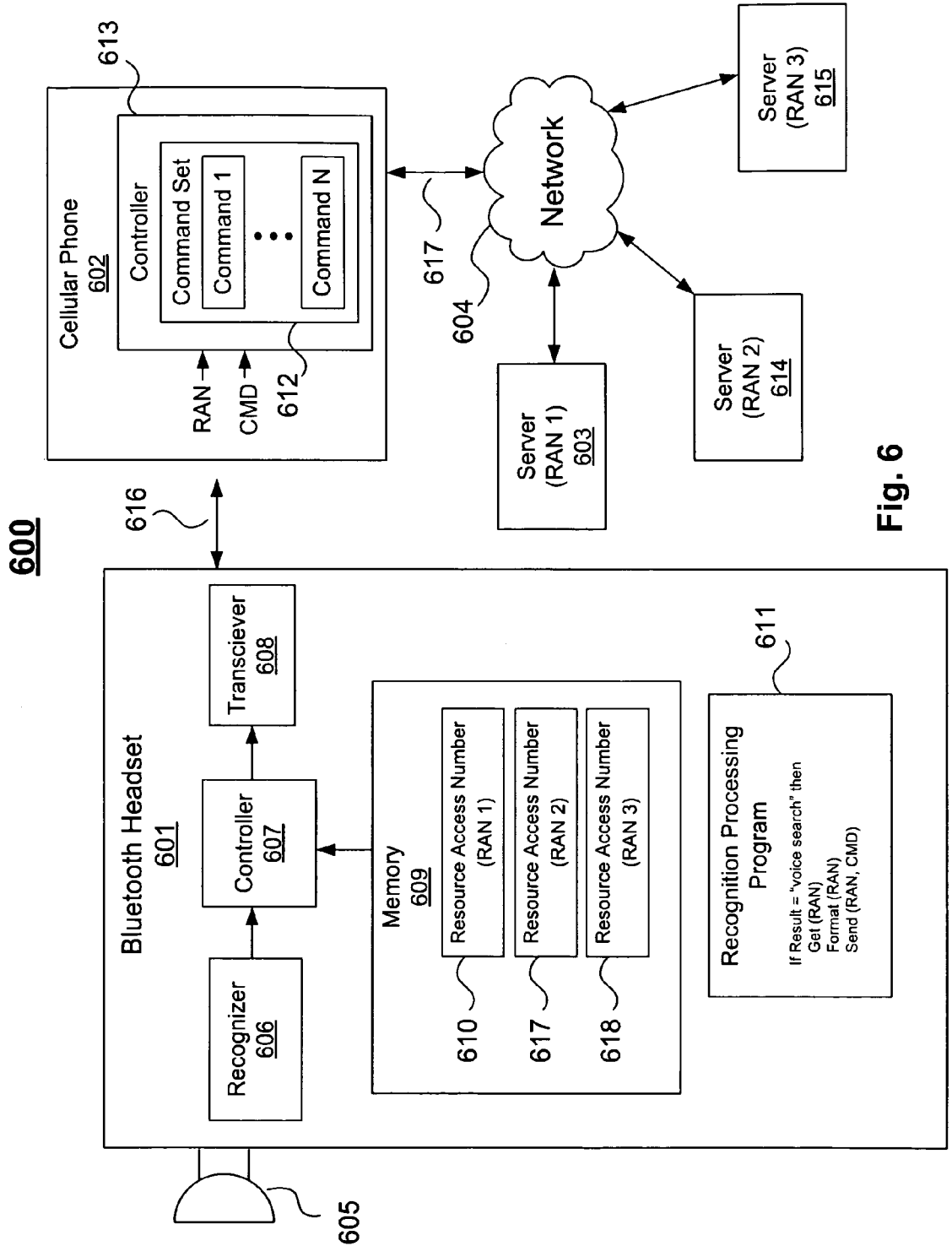
FIG. 6 illustrates a recognition system according to another embodiment of the present invention.

FIG. 6 illustrates a recognition system 600 according to another embodiment of the present invention. Recognition system 600 includes Bluetooth headset 601, cellular phone 602, network 604, servers 603, 614, and 615. The Bluetooth headset 601 includes microphone 605, recognizer 606, controller 607, recognition processing program 611, transceiver 608, and memory 609. This example operates in a similar manner to the system described in FIG. 5. However, in this example, memory 609 includes multiple resource access numbers 610, 617, and 618. In this example, different stored RAN's may be used to perform searches based on specific voice search terms that are part of the recognition set of recognizer 606.

For example, in one embodiment the user may enter a speech input invoking a voice search together with the search parameter, such as "voice search restaurant", for example. "Voice search restaurant" may be converted by the Bluetooth headset into digital data and processed by recognizer 606. Recognizer 606 may recognize the spoken phrase using one or more recognition sets (e.g., one set with the phrase "voice search restaurant" or two sets with the words "voice search" in one set and "restaurant" in another set automatically loaded after the first set). The spoken phrase "voice search restaurant" may have a corresponding resource access number 610 stored in memory 609. Similarly, other voice search requests, such as "voice search movies" or "voice search NASDAQ" may have corresponding RANs 617 and 618 in memory 609. The RANs may be used to establish connections to different resources available on network 604. In one specific example describe below, the RANs may be used to establish direct connections to different nodes in a voice search tree structure.

Figure 7:
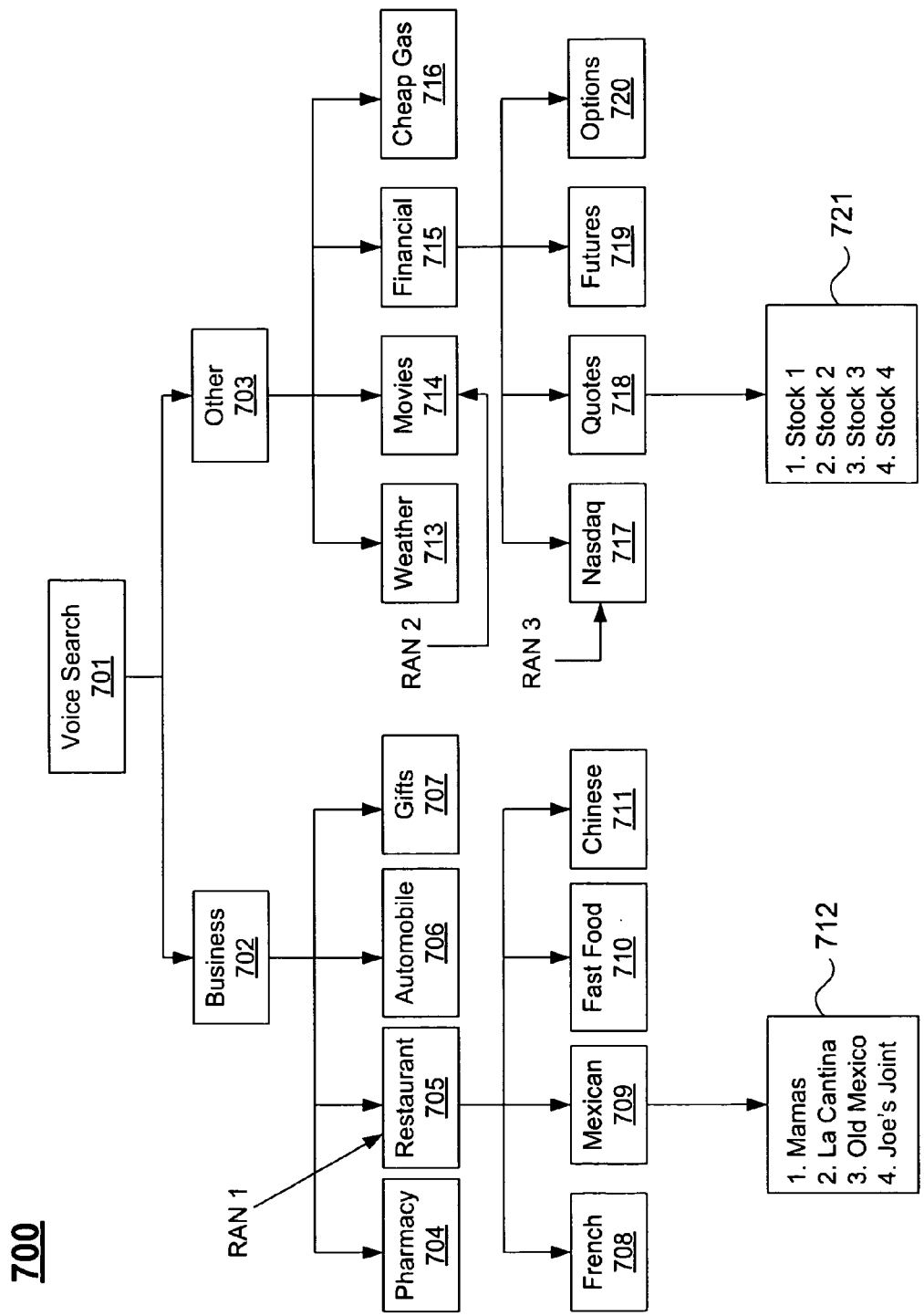
FIG. 7 illustrates another search tree that is accessed to obtain information.

FIG. 7 illustrates a search tree 700 that is accessed to obtain information. FIG. 7 includes nodes 701-721. A user may move between nodes using speech. Each node has access to another node through a hierarchical structure making up tree organization 700. For example, in order to access stock quotes 718, the user may need to first access voice search 701, other 703, financials 715, and quotes 718.

In one embodiment of the present invention a voice user interface (e.g. Bluetooth headset 601 of FIG. 6) may provide direct access to any number of nodes within the tree organization 700. For example, using the examples above, a user may speak "voice search restaurant". In response to this search request, the headset may access RAN 1 and uses RAN 1 to access the voice search tree. RAN 1 may cause cell phone 602 to establish a connection directly into the node labeled 705 so a user can start the voice search at the desired location (e.g., restaurants) within the hierarchy. Similarly, a user may speak "voice search movies". In response to this search request, the headset may access RAN 2 and uses RAN 2 to access the voice search tree. RAN 2 may cause cell phone 602 to establish a connection directly into the node labeled 714 so a user can start the voice search at the "Movies" node. As another example, a user may speak "voice search NASDAQ". In response to this search request, the headset may access RAN 3 and uses RAN 3 to access the voice search tree. RAN 3 may cause cell phone 602 to establish a connection directly into the node labeled 717 so a user can start the search at the node labeled NASDAQ. This example embodiment has the advantage of allowing a user to store different resource access numbers for different voice search parameters in an electronic device and directly access nodes of a voice search tree that are below a root node by speaking a voice search command and one or more voice search parameters. As illustrated in FIG. 6, different RANs may connect to different systems to access different nodes. For example, the voice search telephone numbers for restaurants 705, movies 714, and NASDAQ 717 may all be different. Accordingly, different telephone numbers stored in the headset may be used to establish telephone connections corresponding to different subnodes of a voice search hierarchy. As another example, the Internet addresses to access these voice search nodes may be different (e.g., if each subnode has a different Internet Protocol (IP) address). Therefore, different Internet addresses stored in the headset may be used to directly access different subnodes of a voice search hierarchy.

FIG. 6 has been described in connection with obtaining information for the user of Bluetooth Headset 601. However, electronic devices according to embodiments of the present invention may be used to perform other functions. For example, server 603 may be connected to a device whose operation may be controlled by the user in the following way. Suppose server 603 is connected to the temperature control of a furnace in a remote facility. In this case, the user may say "Temperature command warm home to 71 degrees." This phrase may be converted by the electronic device into digital data and processed by recognizer 606. Recognizer 606 may recognize the spoken phrase "Temperature command."This phrase may have a corresponding resource access number 610 stored in memory 609. Similarly, other requests, such as "Oven command" or "Water command" may have corresponding RANs 617 and 618 in memory 609. The RANs may be used to establish connections to different resources available on network 604 such as the thermostat in the user's home, the oven in his home, or the sprinkler system in his yard. These are examples of personal user applications. Commercial and industrial applications may also be performed. In the case of "Temperature command" being recognized by the electronic device, the remainder of the user's speech may be sent via network 604 to server 603 which recognizes the phrase "Warm home to 71 degrees" in its local speech recognizer and sets the controls on the user's thermostat to 71 degrees. The server may be directly or remotely coupled to the device or system under control, for example.

FURTHER EXAMPLES

Speech synthesis and recognition may allow a user to speak commands that are recognized by the small electronic product, which then responds with synthesized speech or by carrying out requests made by the speaker. A variety of implementations of speech recognition may be used in such consumer electronic products and in many applications across networks. For example, one approach has been described by U.S. Pat. Nos. 6,021,387, 6,665,639, 6,999,927, and 7,092,887, which are hereby incorporated herein by reference as examples of speech recognition.

The current use of speech synthesis and recognition in consumer electronic products leaves much to be desired. Speech synthesis and recognition may not be used as the primary interface in many products because the recognition algorithms and data storage require more memory and computational capability than can be incorporated into small products at reasonable prices and with reasonable recognition accuracies. Thus, for example, speech recognition is found in cellular phones along with push buttons and a display screen, the two of which constitute the primary interface with the user. Thus, speech recognition is a feature and not the primary user interface for such devices. The small electronic device described herein is special in that it may have no keyboard and no display, and may be used without looking at the device, all together making a voice user interface a convenient and functional way of communication and control.

Figure 8A:
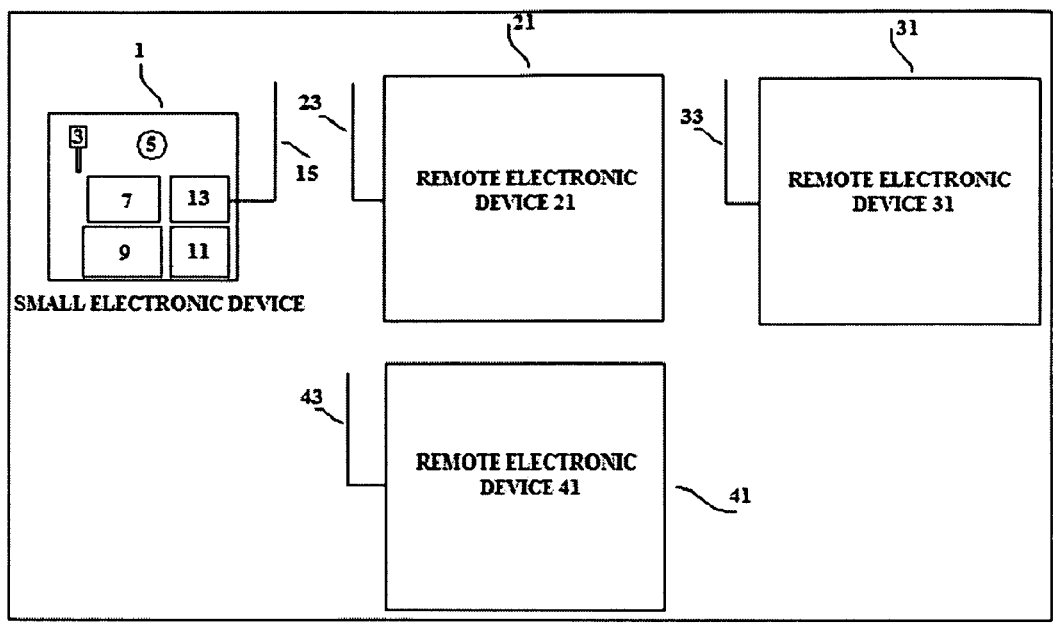
FIG. 8 includes a block diagram of a system according to one embodiment of the present invention.
Figure 8B:
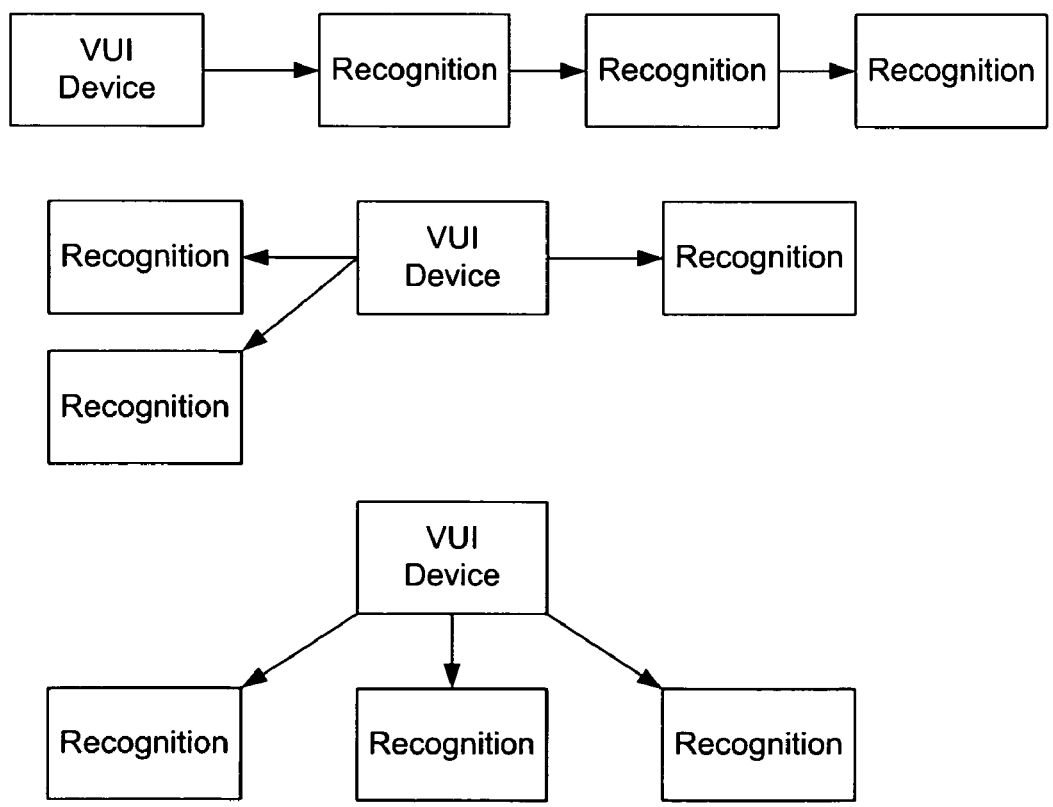

What is desired is a small consumer electronic device such as a Bluetooth wireless headset, a cell phone, or an internet URL system, that has a small number of buttons, or even no buttons, but that does have a speech recognition capability, speech synthesis capability, or both and that is the primary user interface and is adequate for repetitive control commands or information retrieval such as battery check, dialing functions, system status, changing the television channel, turning on the microwave oven, setting the thermostat, accessing songs or music selection, music controls such as volume, balance, tone, etc. Because small synthesizers and recognizers in consumer electronic products do not typically have broad recognition capabilities with the reliability required at a low cost, it is desired that these simpler recognition systems communicate with larger recognition devices having better accuracy, larger databases to access, more MIPS and memory for faster processing and more complex recognition algorithms. Such databases of information stored in remote devices may improve the ability of a user to access the specific information that is needed. For example, it would be convenient for a set top box to know all the possible movies, characters, awards, etc. so a user wishing to select say, an academy award winning movie on TV or video, might access this specific information from the set top box, whereas it would be unwieldy to incorporate such information into the small electronic device. Likewise, information such as schedules, media (music, video, photos, etc.), businesses (location, phone numbers), stock quotes, flight schedules, recipes, or other specialized information might be accessed by the small electronic device from specialized remote devices. For example, a large computer in a remote server could be accessed to achieve the desired recognition accuracy with speech input from a small inexpensive consumer electronic product carried by a user. Thus, the solution to the inadequacy of primary voice user interfaces in small electronic devices consists of using two or more synthesizers and/or recognizers in series, with the first synthesizer and recognizer being the voice user interface as shown in the architecture of FIG. 8A and FIG. 8B. The connection to the remote units, which may be a radio frequency or infra-red signal, an ultrasonic device, Bluetooth connection, WiFI, Wimax, cable or other wired or wireless connection, allows the small electronic device to both control the operation of the remote units and to retrieve desired information from the remote units. Remote units could be set up in series where any unit can query any other unit. The setup could also have the main voice user interface based unit as a hub with remote products connected as a series of spokes, each individually accessible (FIG. 8B). Alternative embodiments may include the small electronic device 1 of FIG. 8 connected in series to an external synthesis and/or recognition device, which could act as the hub to a variety of other devices. Small electronic device 1 could send more complex audio phrases to one or more of the remote electronic devices 21, 31, or 41 of FIG. 8 via a wireless network in order that more complex phrases are recognized with an improved accuracy or where the size of the recognition database is too large to be contained in small electronic device 1, or where the external device needs to recognize a command and transmit information externally to perform a control function or pass audio data for recognition or other purposes.

Figure 9:
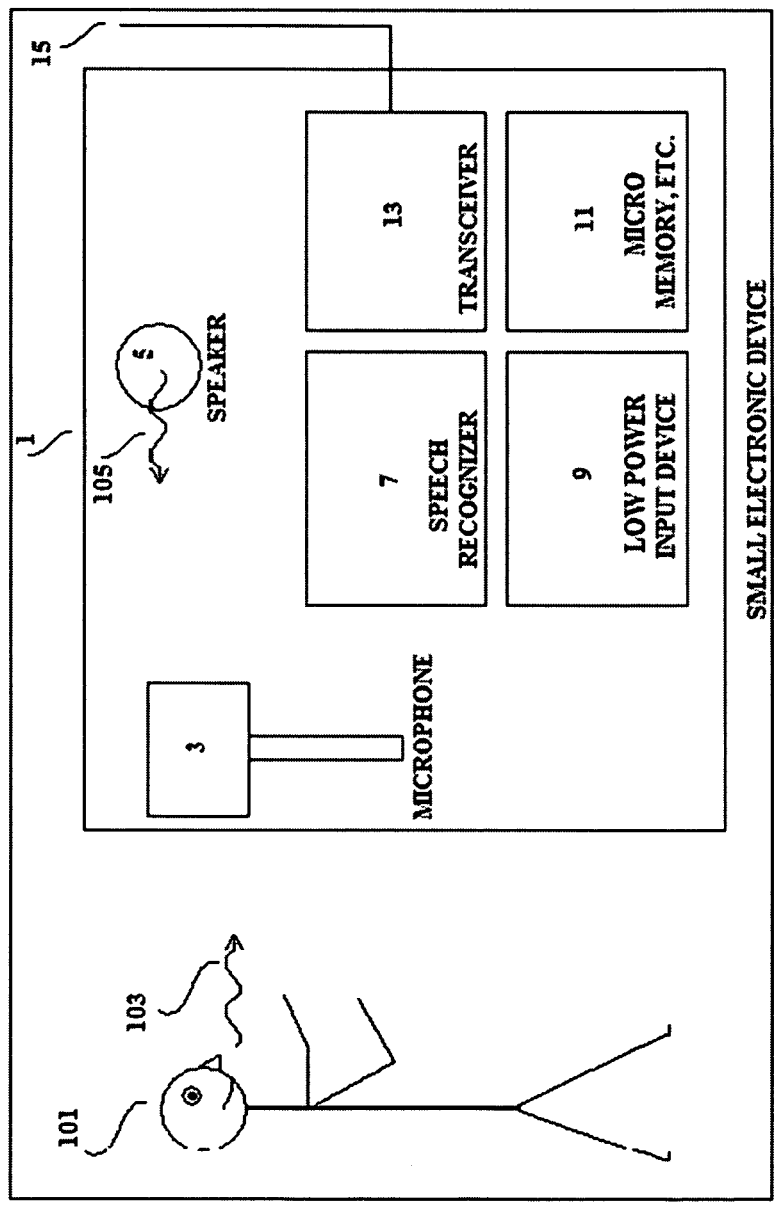
FIG. 9 provides a further description of the small electronic device that contains a speech synthesizer and recognizer and that interacts with a user primarily through speech.

FIG. 8A includes a block diagram of a system according to one embodiment of the present invention. The system of speech synthesizers and recognizers is connected in series through a network and the first synthesizer/recognizer is part of small electronic device 1 that interacts with a user primarily through speech. FIGS. 8A and 9 illustrate the voice user interface consisting of microphone 3, audio speaker 5, speech recognizer or combination recognizer and synthesizer 7, low power input device 9, and microprocessor or microcontroller and memory 11. Via transceiver 13, it may communicate through antenna 15 with remote electronic device 21, remote electronic device 31, or remote electronic device 41. Each device (21,31,41) includes antennas, 23, 33, and 43 (respectively) to receive from and transmit information to small electronic device 1, or to each other. While a wireless system is shown here, the communication between the various electronic modules may alternatively be achieved through a wired link (phone, cable, optical, etc.). Example wireless implementations may include a radio frequency, cellular, infra-red, ultrasonic, Bluetooth, or similar wireless network technologies. For one embodiment, a radio frequency network is assumed. Small electronic device 1 of this embodiment is in a Bluetooth headset. Bluetooth is a protocol for connecting the Bluetooth headset via a radio frequency link to other electronic devices that are located within a few tens of meters. A typical electronic device connected to the Bluetooth headset may be a cellular phone, a navigation device, a music player, a thermostat, or the like, which may be turned on and controlled by the Bluetooth headset. The transmission link between the Bluetooth headset and any other electronic device allows high data rate transfers such that speech, for example, can be transmitted from one unit to the other. In operation, a Bluetooth headset may be paired with a cell phone such that they are able to communicate and transmit voice or other data back and forth to each other. The Bluetooth headset may turn on the cell phone which makes a phone call on command from the Bluetooth headset. The conversation may be heard by the user via the transmission of audio data from the cell phone and playing of this date through speaker 5 of small electronic device 1. The user speaks to the called party via microphone 3 in small electronic device 1 which transmits the audio signal (via transceiver 13, and antenna 15) to the cell phone and from there to the third party. Equivalently, incoming calls can be received by small electronic device 1 via remote electronic device 21 in a hands-free operation.

Small electronic device 1 may connect with a remote electronic device by means other than the Bluetooth protocol described above. For example, small electronic device 1 can be an unconventional cellular phone with no keyboard and no display but that contains a speech synthesis and recognition capability and that interacts with a user primary through the voice user interface provided by these synthesis and recognition capabilities. Or it may have a URL and be connected to remote devices through the internet while interacting with the user through the voice user interface of the speech synthesizer and recognizer.

Small electronic device 1 is more fully described in FIG. 9 and its interaction with user 101 of FIG. 9 via audio 103 from the user or audio 105 from small electronic device 1 to the user is more fully described in the flow charts of FIG. 10. In this description, low power input device 9 is either a single push button or an audio wakeup circuit. Small electronic device 1 of one embodiment may be a Bluetooth headset. Remote electronic device 21 may be a cellular phone. Remote electronic device 31 may be a laptop computer. Remote electronic device 41 may be a telephone server. Each device (21, 31, 41) may include speech synthesis and/or recognition devices.

Figure 10A:
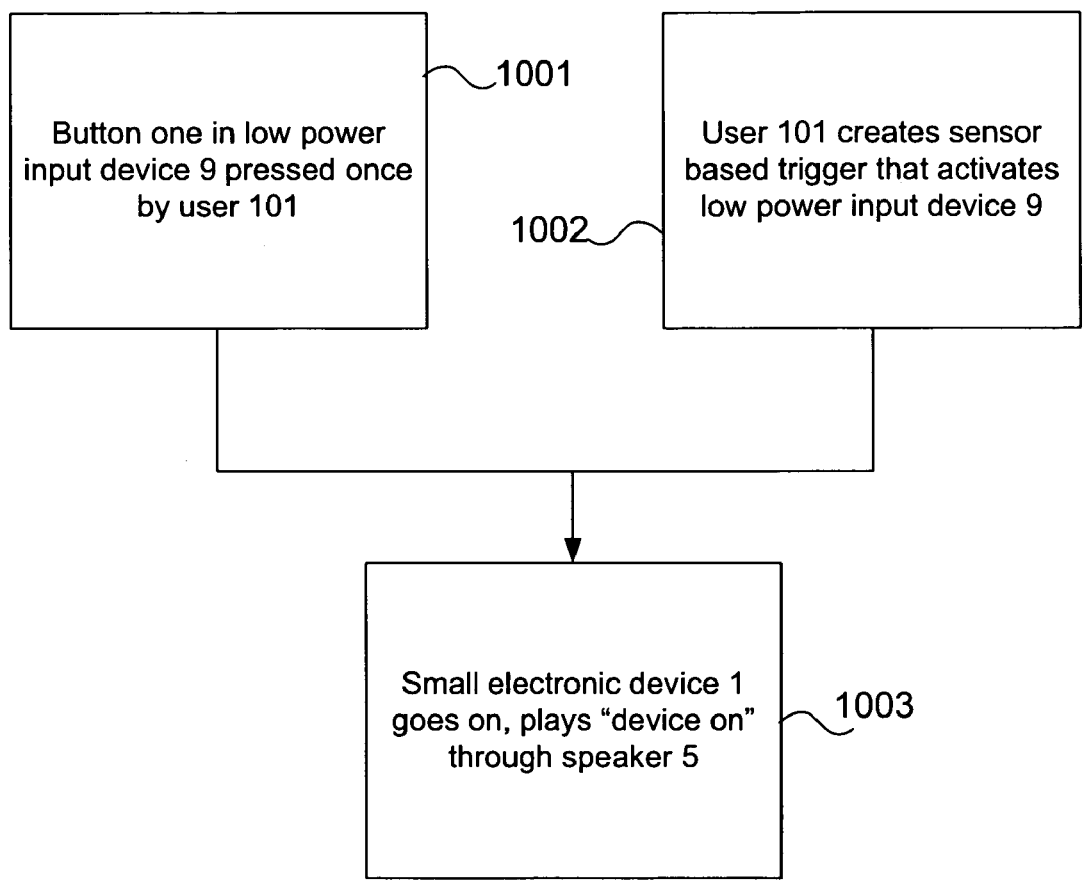
FIGS. 10A-D illustrate flow charts of the interaction between a user, a small electronic device, and other electronic devices that are connected to the small electronic device in series via a network.
Figure 10B:
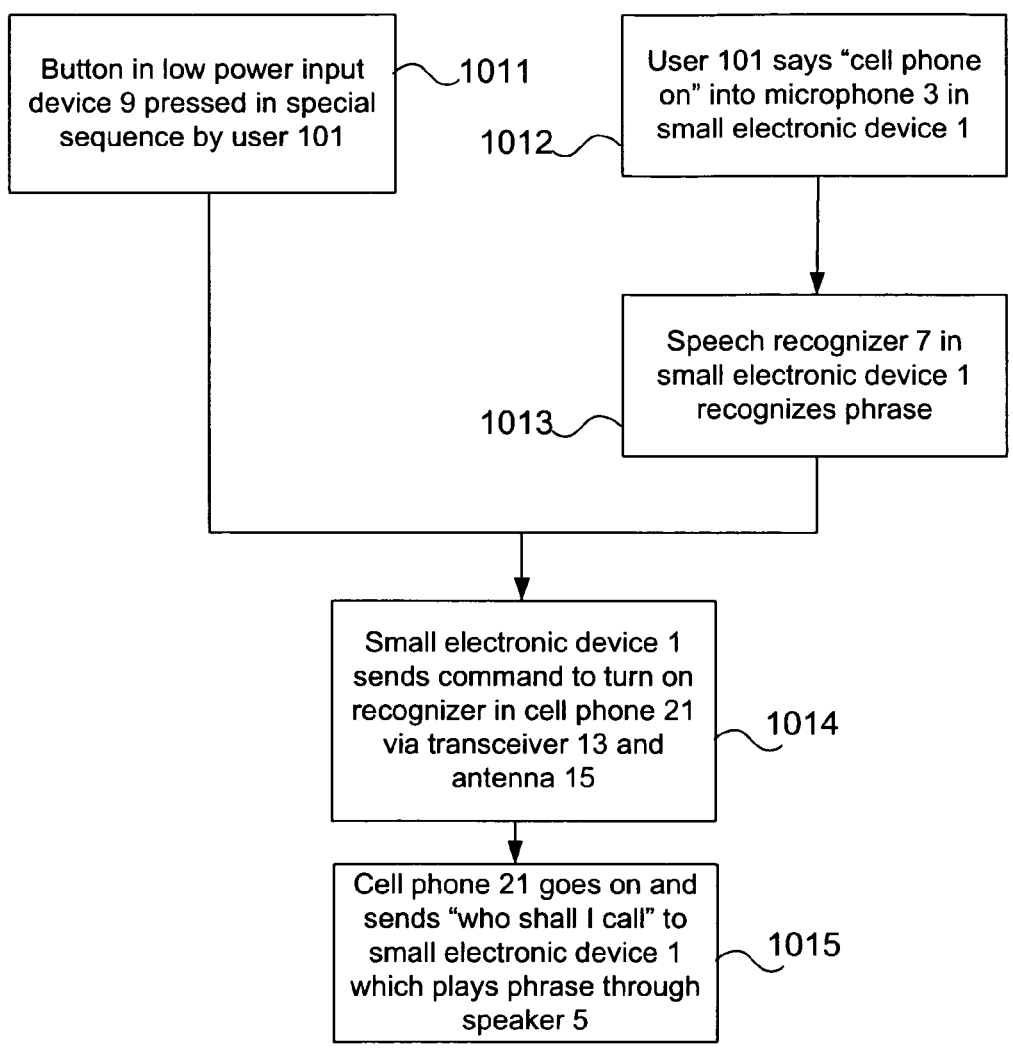

FIG. 10a describes the flow 1000 required to activate small electronic device 1. Because low power input device 9 of one embodiment may be a single button or a low power sensor-based circuit that may be responsive to such as motion, voice activity, pressure, biofeedback, sound, touch, etc., there may be two or more ways for activating small electronic device 1. The first way (1001) may be to push the button and a second way (1002) may be to provide the sensor based input signal. In either case, low power input device 9 responds to the input and activates small electronic device 1 at 1003. It is emphasized that, although small electronic device 1 may have one or a few push buttons, light emitting diodes, and a small liquid crystal display, the primary interaction with user 101 of FIG. 9 in this and the following discussions is through speech synthesis and recognition.

After small electronic device 1 is activated, the next task may be to activate the speech synthesizer and/or recognizer of remote electronic device 21, which is a cell phone in this preferred embodiment. This process (1010), described in FIG. 10b, may occur in two ways. Either the button associated with low power input device 9 may be pressed in a special sequence (e.g. press and hold, press and release twice, etc.) to signal small electronic device 1 to activate the synthesizer/recognizer of remote electronic device 21 (1011), or user 101 of FIG. 9 may say "cell phone" into microphone 3 of FIG. 9 (1012). In this latter case, speech synthesizer and recognizer 7 in small electronic device 1 recognizes the spoken phrase (1013). In either case, upon receipt and interpretation of the data from low power input device 9, microprocessor 11 generates a signal that is passed via transceiver 13 and antenna 15 through antenna 21 of remote electronic device 21 to the internal electronics of the cell phone in order to turn on the speech recognizer in the cell phone (1014 & 1015).

Figure 10C:
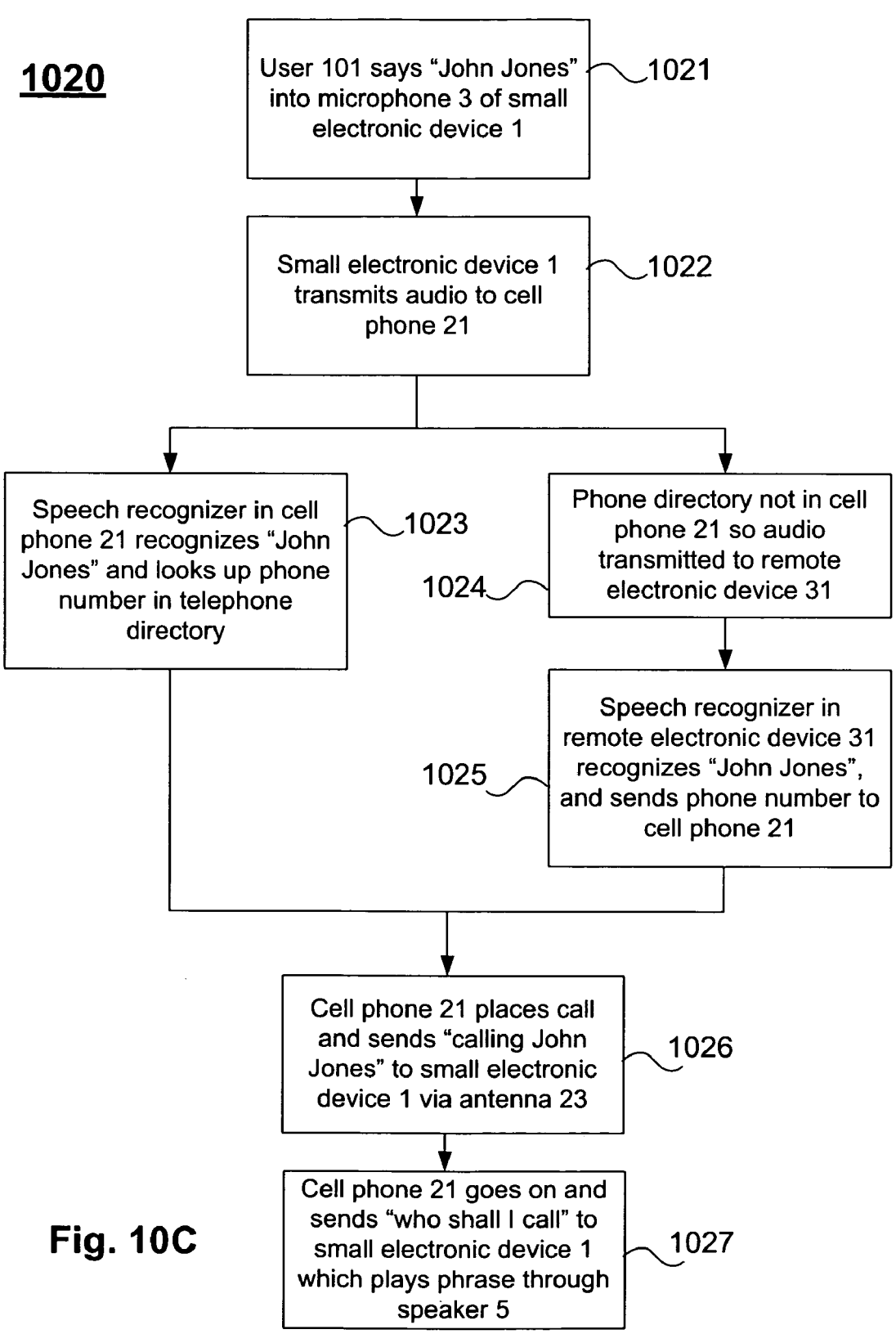

After small electronic device 1 and remote electronic device 21 are on, small electronic device 1 prompts user 101 to say a name via a synthesized voice message. As shown in FIG. 10c (flow 1020), user 101 says "John Jones" into microphone 3 of small electronic device 1 (1021). Because the directory containing the phone number of John Jones is not in small electronic device 1, the audio message is transmitted to remote electronic device 21 (1022). If this device contains the phone directory, the speech recognizer in remote electronic device 21 recognizes the spoken name and looks up the telephone number in the directory (1023). If the phone directory is in remote electronic device 31 and not in remote electronic device 21, the audio signal is transmitted from remote electronic device 21 to remote electronic device 31 (1024). The speech recognizer in this device recognizes the spoken name and transmits the phone number to remote electronic device 21 (1025), which both calls the number and sends the audio message "Calling John Jones" to small electronic device 1 via antennas 23 and 15 (1026). Small electronic device 1 announces this message through speaker 5 and audio waveform 105 so the user is alerted to begin the phone conversation (1027). The conversation proceeds via transmissions between remote electronic device 21, and small electronic device 1. Thus, the cell phone never needs to be removed from the user's brief case and its carrying case.

Figure 10D:
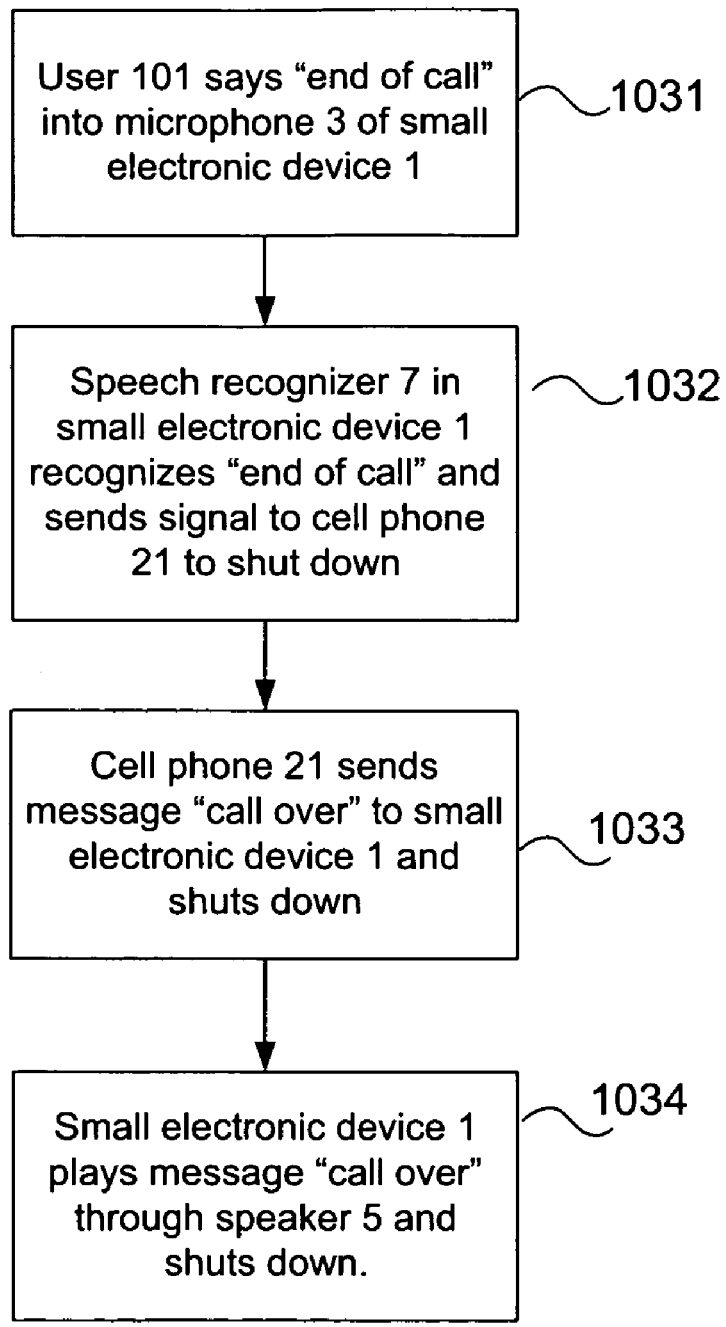

At the end of the phone conversation, the call is terminated (1030), as described in FIG. 10d. User 101 says "End of call" into microphone 3 of small electronic device 1 (1031). Speech synthesizer and recognizer 7 of this device recognizes the phrase and sends a signal to remote electronic device 21 to shut down (1032). On receiving this message, remote electronic device 21 transmits the synthesized phrase "call over" to small electronic device 1 and then shuts down (1033). Small electronic device 1 plays this message through speaker 5 and then shuts down (1034). In other embodiments, the call may be ended through a variety of other means including lack of audio activity for a predetermined time, a button press, or other sensory input signaling that the call is to be ended, including alternative speech commands.

Embodiments that use multiple speech synthesizers and recognizers in series and that differ from that described in FIG. 10 are possible. For example, suppose user 101 desires to remotely control the oven in his home. Through the procedures described in FIGS. 10A-D, he speaks the message "Turn oven on at 3:30 and cook at 350 degrees for 45 minutes." This requires a complex speech recognizer to decipher this message and such reliable capabilities may be inconsistent with a low power small electronic device. Thus, small electronic device 1 may transmit this message to remote electronic device 41 (either directly or through remote electronic device 21) which contains a powerful computer and the capability for recognizing this message. Remote electronic device 41 deciphers and recognizes this message and either controls the oven directly or sends the information back to small electronic device 1 that then controls the operation of the oven.

In such examples, small electronic device 1 adds substantial value to the system beyond being an efficient interface with user 101 and sending voice signals to remote electronic devices 21, 31, or 41. For example, speech signal 103 from user 101 may be preconditioned for recognition by having a clear start and stop point, and by having a signal to noise ratio that is maximized through multiple microphone beam forming, noise suppression, echo suppression, or other conventional DSP based signal processing methods contained in small electronic device 1.

This capability for improving the quality of the speech from user 101 in small electronic device 1 may also be used to implement a barge-in capability that allows it to optimize and record the audio command from user 101, even during reception of incoming audio signals. This recorded audio signal may then be analyzed by speech synthesizer and recognizer 7 in small electronic device 1 or it may be sent to remote electronic device 21, 31, or 41 for a more sophisticated speech recognition analysis, after which the command is implemented by the remote electronic device or it sends a digital signal to small electronic device 1 with the recognition result.

Other examples of commands that may be implemented in small electronic device 1 through the voice user interface of this device are possible. For example, the current art includes a Bluetooth specification called Audio/Video Remote Control Profile (AVRCP), which is a protocol that allows small electronic device 1 to interact with Bluetooth capable devices such as a player/recorder, monitor/amplifier, tuner, and the like. This interface specification includes 57 commands such as select, up, down, left, right, favorite menu, exit, 0, 1, 2, 3, 4, 5, 6, 7, 8, 9, enter, clear, channel up, input select, help, sound select, page up, page down, volume up, volume down, mute, play, pause, stop, record, rewind, eject, fast forward, and the like. In the current art, no more than a few of these commands may be implemented (such as play, stop, skip, and previous) because there are not sufficient buttons on small electronic devices to handle a large number of commands or for user 101 to remember the button sequences for generating many commands. Instead, with the voice user interface of speech synthesizer and recognizer 7 and microprocessor 11 in small electronic device 1, the 57 commands become audio phrases spoken by user 101 and recognized and transmitted as digital commands to the remote electronic devices from electronic device 1.

Some such commands are important to user 101 because they provide control information that cannot be obtained in a simple way. Voice commands such as "Am I on?" or "Battery check" enable user 101 to know the status of his interaction with small electronic device 1 in a simple fashion. A sample specification illustrating this capability is shown in Appendix A of this Application entitled "BlueGenie Voice Interface." Similarly, set-up procedures such as pairing small electronic device 1 with a remote device, which is currently done through a series of complex commands that require memorizing or reading the owners manual, may be done by user 101 by being guided through the process with synthesized speech phrases from small electronic device 1 after he says "Pair mode."

Remote electronic devices 21, 31, or 41 may perform functions and inform small electronic device 1 of their actions. For example, remote electronic device 21 may be a GPS navigation system that is set up by interaction with small electronic device 1 and user 101, who speaks information such as the desired destination of the trip. Then remote electronic device 21 synthesizes speech that gives audio information to user 101 through small electronic device 1, with such audio information consisting of directions to the desired destination.

In one embodiment of small electronic device 1, phone numbers or internet addresses for specific destinations may be pre-programmed into it. Thus, for example, the phone number for a voice search engine may be pre-programmed into it. Instead of having to look up a phone number via the multiple speech recognizers or having to program a phone number into his system, user 101 simply says "voice search." After recognition of this phrase by the speech recognizer in small electronic device 1, the voice search phone number that is pre-stored in small electronic device 1, is called. In this way, user 101 obtains information by simply saying a key phrase associated with an information source and by having the phone number of such information source pre-programmed into small electronic device 1. The pre-stored number for voice search, as an example, may be an unlisted number that is not generally marketed and that a user may access automatically through interaction with small electronic device 1. Thus, there can be a different phone number when user 101 says "voice search, map" than when he says "voice search, Mexican restaurant." So user 101 obtains the information he desires without encountering menus associated with the direct dial number of a voice search engine. In addition, connection through these pre-programmed numbers can offer user 101 special features or services that are not available by dialing a listed voice search phone number. For example, there could be a discount associated with using the pre-programmed number or there could be special offers, special information, or other features.

Figure 11:
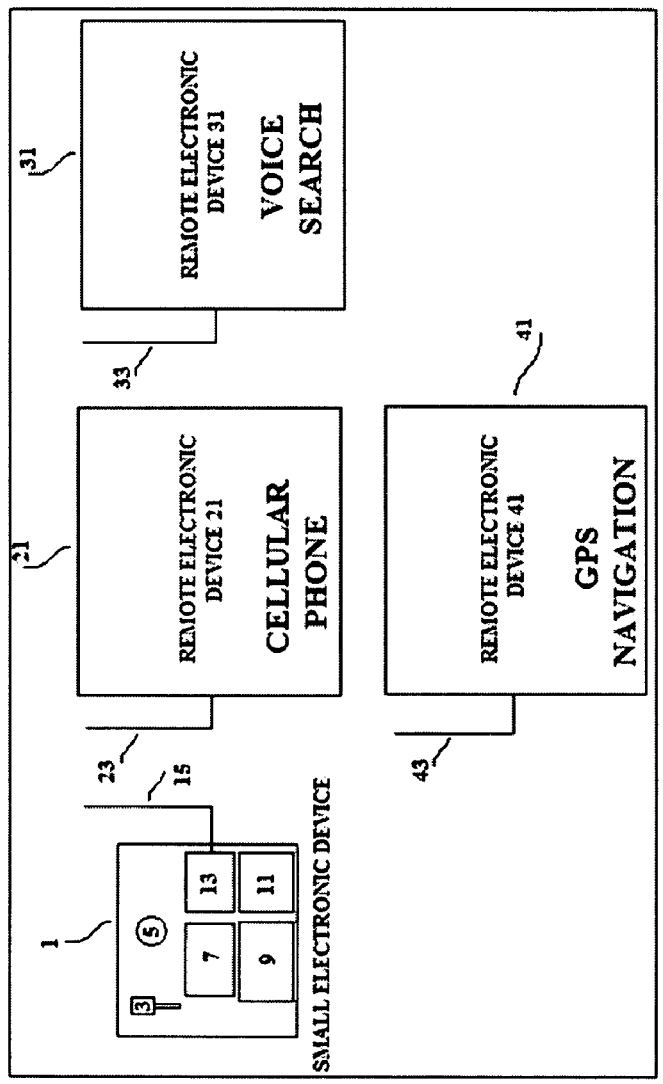
FIG. 11 is a block diagram similar in structure to that of FIG. 8 except that the remote electronic devices are specifically identified as a cellular phone, voice search engine, and GPS navigation device.

FIG. 11 is an example method of interacting with a voice search engine. In this example, remote electronic device 21 is a cellular phone, remote electronic device 31 is a voice search engine, and remote electronic device 41 is GPS navigation device. Remote electronic device 21, the cellular phone, may be separate from small electronic device 1, as described above and as illustrated in FIG. 11, or the cellular phone may be a small electronic device 1 that a user interacts with primarily through a voice user interface. It may have speech recognition and synthesis capabilities associated with voice dialing and other functions or it may not have either capability. Remote electronic device 31, the voice search engine, has both speech synthesis and recognition capabilities for interpreting the speech from user 101 and generating queries or providing information. Remote electronic device 41, the GPS navigation system, has only speech synthesis capabilities that are used to guide a driver along a route. This device may be located in the user's vehicle or somewhere proximate to the user, for example, so that the user can determine their location automatically (e.g., while driving). Small electronic device 1 of FIG. 11 is turned on and operated in the manner described by FIGS. 10A through 10D. When it is on, user 101 says "voice search," which is recognized by small electronic device 1 that then uses the cellular network to call the pre-programmed phone number or internet address associated with remote electronic device 31, the voice search engine. The search tree of the voice search engine is illustrated in FIG. 7, and voice search 701 of this figure is the entry point to the voice search engine when user 101 says "voice search." At this point, the speech synthesizer in remote electronic device 31, the voice search engine, says "Business or other?" to which user 101 might respond "Other." This phrase is recognized by the speech recognizer associated with remote electronic device 31, the voice search engine, which then advances to Other 703 in the search tree of FIG. 7 and synthesizes "Weather, movies, financial, or traffic?" User 101 responds "financial" which the search engine recognizes and advances to Financial 715 in the search tree of FIG. 7 before synthesizing "Nasdaq, Quotes, Futures, or Options?" After user 101 says "quotes," the search engine recognizes this phrase and advances to quotes 718 in the search tree 700 of FIG. 7, after which it synthesizes the prices of stocks 1 through 4 that have been selected previously by user 101 as being of interest.

This example method of accessing the voice search engine is efficient for user 101 because he does not have to remember the phone number of the voice search engine or program it into his phone directory. However, it is cumbersome because he has to work his way through the search tree of FIG. 7 to reach the point of interest. In another embodiment of the present invention, preprogrammed numbers for each of the nodes in a search tree as illustrated in FIG. 7 are stored in small electronic device 1. In this case, user 101 says "voice search Mexican restaurants" which is recognized by speech recognizer 7 of small electronic device 1 or by the recognizer in remote electronic device 21, after which remote electronic device 21, the cellular phone, calls the number associated with the node "Mexican" 709 (e.g., Mexican Restaurants) in the search tree of FIG. 7 to receive a list of the Mexican restaurants in his vicinity. To know the location of the user, the search engine may ask for user 101 to speak his location which it recognizes in its speech recognizer or it may be able to obtain his location by querying remote electronic device 41, the GPS navigation system through small electronic device 1 of FIG. 11. Similarly, if user 101 wants to know the location of the cheapest gas station in the neighborhood, he simply says "voice search cheapest gas" which is recognized by recognizer 7 in small electronic device 1 or by the recognizer in remote electronic device 21, the cellular phone, after which small electronic device 1 calls the phone number of cheap gas 716 in the search tree of FIG. 7 and also sends it the user's location from the GPS system. The voice search engine then synthesizes the names and locations of the four cheapest gas stations in the neighborhood of the current location of user 101. In this way, user 101 obtains the desired information as a result of interacting with the speech synthesis and recognition system in small electronic device 1, which, in turn communicates with the speech synthesizer and recognizer in remote electronic device 31, the voice search engine via electronic device 21, the cellular phone network, by calling the appropriate one of the many phone numbers that are preprogrammed into small electronic device 1. Some requests from user 101, such as stock quotes, do not require knowledge of the user's location, in which case remote electronic device 41, the GPS navigation system, is not involved in the interaction. In other cases, remote electronic device 41, the GPS navigation system, is needed for information on the user's location in order to obtain locations of nearby businesses, traffic conditions, or the route to a desired location. In this latter case, the speech synthesizer in remote electronic device 41, the GPS navigation system, is used to guide the user to his desired location with audible instructions.

In the example of FIG. 11, small electronic device 1 is paired with both remote electronic device 21, the cellular phone, and remote electronic device 41, the GPS navigation system, in order that its interaction is confined to these two electronic devices and not to other remote electronic devices.

Small electronic device 1 can also assist user 101 in interfacing to remote electronic devices 21, 31, or 41 or other callers. For example, a call back function may be enabled in small electronic device 1 by storing the phone number, internet address, or the like of the remote electronic device that last contacted it. When user 101 says "call back," speech synthesizer and recognizer 7 in small electronic device 1 recognizes the phrase and it accesses the last called number that is stored in its temporary memory.

The final activity in each of FIGS. 10A through 10D is audio feedback to user 101 via small electronic device 1. This audio feedback may be a male voice, a female voice, or a character voice, as examples. It may also be in English, Spanish, French, or any other language. User 101 may speak a language that is known to small electronic device 1 by virtue of its recognition programming. Alternatively, speech recognizer 7 in small electronic device 1 may perform recognition to determine the language spoken by user 101. Because speech synthesizer and recognizer 7 in small electronic device 1 is able to determine the language spoken by user 101 or because user 101 speaks a language that is known to small electronic device 1, this device is able to respond in that same language. Because storage of synthesized phrases in many languages in small electronic device 1 may be incompatible with the data storage and speech synthesizer capabilities of small electronic device 1, this device can request remote electronic device 21, remote electronic device 31, or remote electronic device 41 of FIG. 8 to send responses in the desired language that it then plays for user 101. In a similar way, the synthesized speech from the remote electronic devices can be selected to be in the same voice as that of the synthesized speech stored in small electronic device 1. In this way the speech interaction between small electronic device 1 and user 101 occurs in a consistent voice in the language of user 101, so the interaction is seamless to the user because the speech phrases are stored and synthesized in a remote electronic device.

Just as the synthesized speech may be in the language of user 101, he may also be able to speak to small electronic device 1 in his own language. Recognition of any of several languages is accomplished by small electronic device 1 sending such audio commands to remote electronic device 21, 31, or 41, which electronic device contains speech recognition capabilities in several languages. The user's language is also transmitted from small electronic device 1 to the remote electronic device which uses the appropriate language recognizer to interpret the command spoken by user 101. In this way the complete interaction between user 101 and small electronic device 1 is carried out in the language selected by the user and there is no need to have different small electronic devices for each language or to force user 101 to speak and understand English.

Another improvement in the voice user interface between user 101 and small electronic device 1 stems from the fact that the background noise environment during this interaction can vary over a large dynamic range. This requires that the speech volume from speaker 5 of FIG. 9 be adjusted to compensate for the background noise. This is accomplished by microprocessor 11 of FIG. 9 monitoring the background noise level and adjusting the gain of the speech signal fed to speaker 5 User 101 may also control this signal level with voice commands such as "louder" or "softer," which are recognized by speech synthesizer and recognizer 7 which instructs microprocessor 11 to take the requested action.

The above description illustrates various embodiments of the present invention along with examples of how aspects of the present invention may be implemented. The above examples and embodiments should not be deemed to be the only embodiments, and are presented to illustrate the flexibility and advantages of the present invention. Based on the above disclosure aims, other arrangements, embodiments, implementations and equivalents will be evident to those skilled in the art and may be employed without departing from the spirit and scope of the embodiments of the invention described above. The terms and expressions that have been employed here are used to describe the various embodiments and examples. These terms and expressions are not to be construed as excluding equivalents of the features shown and described, or portions thereof, it being recognized that various modifications are possible.

APPENDIX A

Example Voice Interface

This document describes the key technologies, user interface, key functions, voice prompts (synthesis) and voice recognition commands (active vocabulary) in a Voice Interface.

A reference headset demonstration may be provided to implement the application layer so that actual functions on the headset are enabled for the Voice Interface. This application can run on either the standard BC-5MM development board, the CSR BC-5MM reference mono headset, or Foxlink's Ares demonstration headset.

I. Blue Genie Technology

Sensory has created a CSR-like plug-in for implementation of the Blue Genie technology. The key technology functions include:

A. Speech Recognition. Sensory is implementing its speaker independent recognition technology that works out of the box with no training for any given language. A Hidden Markov Modeling (HMM) approach is used with phonemic word modeling to allow rapid creation of new custom vocabulary words. Accuracy can always be improved through custom recordings and training.
  i. Set size. At any given time Sensory can recognize 20 or more words. These words being listened for at any given time are known as an Active Vocabulary. Active vocabularies can be switched at any given time like in a tree branching structure.
  ii. Language support. Sensory has collected the necessary training data to implement the Blue Genie technology in American English, British English, French, Spanish, Italian, German, Mandarin, Japanese, Korean and other popular languages. Sensory's initial implementation is in American English. Other languages may quickly be added as requested and prioritized by customers.
  iii. Memory usage. The recognition technology uses approximately 26 KB of flash memory and approximately 4.5 KB of Kalimba code and data RAM. Data flash is approximately 2 KBytes of flash for each ten recognition commands.
  iv. Triggering the recognizer. The preferred usage model calls up the recognizer for a 3 second listening window (as opposed to always on always listening which wears down batteries). The recognizer can be called by a software triggered event (e.g. an incoming phone call) or a button press. A MultiFunctionButton or VUI may be used to call the recognizer.
  v. Continuous digits and complex grammars. Sensory has implemented complex grammars capable of allowing continuous digit streams to be spoken.
  vi. Accessing external recognizers. The Blue Genie Voice Interface can seamlessly access either server or handset based recognition to improve functionality of voice recognition capabilities. Sensory offers a variety of technologies that can enable handset based search functions for music or navigation, or server based recognizers for business or other search functions.
  vii. Accuracy. Accuracy is a function of the quality of the users voice, the signal to noise ratio, the recognition vocabulary, and the system components. Sensory can help to improve accuracy by being involved in system specifications and reviews, and expects that >95% accuracy is achievable for properly implemented and used products.
B. Speech Playback.
  i. Compression. Sensory uses ADPCM and LPC like approaches to compress and play back recordings of phrases and words. The process starts with an actual recording of a real person speaking, and this speech is digitized and compressed down yet retains a very natural quality and sounds much like the original recording. Speech compression is a nice technology for easily adding an individualized personality to your products.
  ii. Text-to-speech. Text to speech algorithms tend to be too large to run in parallel with speech recognition. This is important to note, because if a synthesis prompt is used to ask a question of the user (e.g. "Please speak your command"), users will immediately respond and will not wait for a recognizer to load. This could lead to poor accuracy results when words are cut off. Text to speech is important for caller id functions and for this usage Sensory can implement digit or letter playback. A small footprint TTS engine that can run concurrently with recognition on headsets.
C. Dual Microphone Beam-forming. Dynamic Hearing dual mic beam forming technology may be used to improve speech recognition in the presence of noisy environments. This technology is included as a standard part of the Blue Genie Voice Interface in all 2 mic products.

II. Blue Genie Voice Interface Application
The goal of the initial application is to be a HIGH VALUE, LOW RISK usage model. There are several Key areas where the Blue Genie Voice Interface adds value:
  A. Basic access to information. Press the MFB button & make voice requests. Key recognition words:
    i. Check Battery—to check battery level
    ii. What Can I Say?—Lists all available commands
    iii. Am I Connected?—Tells connection status
  B. System set up and communications.
    i. Phone command—opens link to phone based recognizer
    ii. Pair Mode—Puts headset in pair mode and voice prompts user through pairing process
    iii. Voice Interface Settings—turn on/off prompts & recognition
  C. Handsfree control
    i. Answer or ignore incoming calls by voice (Answer or Ignore)
  D. Voice Dialing
    i. Favorites—up to 5 preset favorites by saying Call Favorite One (call favorite two, etc.)
    ii. Preset numbers like Call Information
    iii. last number Redial
    iv. Call back last incoming call
    v. Preset locations (tied to speed dial): "call office" "call home" "call voicemail"
  E. Voice setting of controls—great for music
    i. Adjust Volume
  F. Voice prompting instead of "beeps"
    i. Confirmation of incoming and outgoing phone numbers
    ii. Natural sounding voices available in any language
    iii. Easier to interpret than beeps and flashes
    iv. Prompts include:
      a. "System Busy" prompt when attempts to perform function are interrupted by system functions
      b. "Call Terminated" prompt in the event that a call is dropped or terminated by the user III. Blue Genie Voice Interface Application Details
A. Standby and Idle Mode. The main usage environment is the Standby and Idle mode where the usage is as follows:
<User presses the primary button>
Headset: "Please say a command"
User: <Says one of the active voice recognition commands>
  The active voice recognition commands are:

---

| | | |
|---|---|---|
| Phone Command | → | <Headset initiates voice recognition on phone for Voice Dialing function by name.> |

-continued

| | | |
|---|---|---|
| | | Voice Dial activated. |
| Redial | → | <Headset redials last out going call> |
| | | Calling Back last outgoing call. |
| Call Back | → | <Headset calls back last incoming call> |
| | | Calling Back last incoming call. |
| Call Favorite 1* | → | <Headset calls stored Favorite 1/Speed Dial 1> |
| | | Calling Favorite 1. |
| Call Favorite 2* | → | <Headset calls stored Favorite 2/Speed Dial 2> |
| | | Calling Favorite 2. |
| Call Favorite 3* | → | <Headset calls stored Favorite 3/Speed Dial 3> |
| | | Calling Favorite 3. |
| Call Favorite 4* | → | <Headset calls stored Favorite 4/Speed Dial 4> |
| | | Calling Favorite 4. |
| Call Favorite 5* | → | <Headset calls stored Favorite 5/Speed Dial 5> |
| | | Calling Favorite 5. |
| Call Voicemail* | → | <Headset calls Voicemail> |
| | | Calling Voicemail. |
| Call Home* | → | <Headset calls Home> |
| | | Calling Home. |
| Call Office* | → | <Headset calls Office> |
| | | Calling Office. |
| Call Information | → | <Headset calls Goog411 (1-800-466-4411)> |
| | | Calling Goog411. |
| Check Battery | → | <Headset announces battery level> |
| | | Battery level X. |
| Check Battery Level | → | <Headset announces battery level> |
| | | Battery level X. |
| Am I Connected? | → | <Headset announces connection status> |
| | | Your headset is connected//There is no active phone connected. |
| | | NOTE: If no connection exists but previous Paired device is present |
| | | headset will attempt to connect automatically after Query. |
| Adjust Volume | → | <Headset announces instructions for adjusting volume> |
| | | Use the up and down arrows to adjust volume. |
| Pair Mode | → | <Headset initiates pairing> |
| | | Entering Pair Mode. |
| | | IF ACTIVE CONNECTION ALREADY EXISTS device will warn & |
| | | ask for YES/NO confirmation before breaking connection and |
| | | entering Pair Mode. |
| What Can I Say | → | <Headset announces active recognition commands/help menu> |
| | | Active dialing commands are Phone Command, Redial, Call Back, Call |
| | | Voicemail, Call Office, Call Home, and Call Favorite followed by numbers |
| | | 1 through 5. Other active commands are Check Battery, |
| | | Am I Connected, Adjust Volume, Pair Mode, and Phone Command. |
| Voice Interface Settings | → | <Headset enters VUI Settings Mode> |
| | | Voice Interface Settings. Choose one of the following: |
| | | Enable/Disable Initial Prompt, Enable/Disable Caller ID Announcement, |
| | | or Disable Voice Interface. To re-enable Voice Interface, |
| | | hold volume down button for 5 seconds. → Voice interface enabled. |
| | | Note: Only available options will be played. Volume level is reset |
| | | to default level after VI is re-enabled. |
| | | *Backup prompt: Voice interface settings can be used to enable or |
| | | disable initial prompts, caller ID announcement, or disable all voice |
| | | interface functions and return to button only operation. |
| Phone Command | → | <Headset sends standard Bluetooth message to phone to start its voice |
| | | recognition & open audio channel for handset based recognition> |
| | | " (Useful for Name Dial from Phone Contacts, etc) |
| | | "Phone Command Activating" |

*Note: In order for these commands to dial the associated numbers, they must be setup per the instructions below. See Active Dialing Commands.

B. Function Descriptions

Pairing to a New Device. To connect a device to the headset, you must first put your headset in Pair Mode. Press the primary button on the headset and say "Pair Mode." Enable the Bluetooth search function on your device. Search and select for the headset's ID—(varies by Software revision). When prompted, enter '0000' as the passcode. To check your connection, press the primary button on the headset and say, "Am I connected?" The headset will announce the connection status.

Note: Saying "Pair Mode" after a connection has been made will initiate a YES/NO confirmation before breaking the connection and entering Pair Mode.

Connecting to a Previously Paired Device. The "Am I Connected" command first checks connection status and prompt confirms. If no connection exists, but previously paired device is present headset will automatically re-connect. Future commands will enable connecting to different target devices (Device 1, Device 2, etc) which have active pairs with the headset.

Adjusting the Volume. Volume can be adjusted by using the up/down buttons on the headset. An iterative tone is played back as volume is increased or decreased.

Active Dialing Commands. In order to use the following commands, the headset must have a stored number to call. A number is stored once a call is made to/from a phone which is connected to the headset (Redial & Call Back). In order to use the following commands, phone numbers must be stored as follows:

| | |
|---|---|
| Call Favorite 1 | Favorite/Speed Dial 1 |
| Call Favorite 2 | Favorite/Speed Dial 2 |
| Call Favorite 3 | Favorite/Speed Dial 3 |
| Call Favorite 4 | Favorite/Speed Dial 4 |
| Call Favorite 5 | Favorite/Speed Dial 5 |
| Call Home | Favorite/Speed Dial 6 |
| Call Voicemail | Favorite/Speed Dial 7 |
| Call Office | Favorite/Speed Dial 8 |

Checking Battery Level. The headset battery level can be checked by saying any one of the following commands:
Check Battery
Check Battery Level
Battery levels vary according to the percentage of remaining battery life. (NOTE: the measuring algorithm has to be calibrated for the specific battery used)
Voice Interface Cancel Operations
    Cancel during a Voice Recognition listening window
- - - MFB pushed during listening period cancels and says "cancelled"
- - - After listening window has expired, MFB push re-initiates Voice Recognition
    Cancel during "What Can I Say" prompt playback
- - - MFB push stops playback of prompt and initiates listening window with "say your command" prompt
    Cancel during placement of a call—(for situations unintended # is being dialed and user wants to cancel)
- - - MFB push during placement of call, cancels outgoing call, and says "cancelled"
    Cancel during Pair Mode
- - - MFB Push while pair mode active cancels Pair Mode, says "cancelled"

What is claimed is:

1. A wireless electronic device comprising:
a microphone for receiving a speech input;
a speech recognizer coupled to the microphone to receive the speech input;
a memory, the memory comprising a stored resource access number; and
a Bluetooth wireless transceiver for sending information from the electronic device to one or more other electronic devices using a Bluetooth protocol,
wherein said electronic device is a Bluetooth headset,
wherein the speech recognizer is configured to recognize a first spoken command word, and wherein if the first command word is recognized in the speech input, then the speech recognizer generates a corresponding first command result,
wherein if the first command result matches a predefined criteria, then the electronic device automatically accesses the resource access number from memory and sends the resource access number and an externally executed command through said transceiver to a second electronic device, said second electronic device comprising a cellular phone, and
wherein the externally executed command is received by the second electronic device and executed on the second electronic device, and in accordance therewith, the second electronic device uses the resource access number to establish a communication channel between said second electronic device and at least one remote device, and
wherein a user provides second speech input to said microphone, and wherein the second speech input is sent from the Bluetooth headset to the second electronic device and through the communication channel to the at least one remote device, and the at least one remote device performs speech recognition on the second speech input.

2. The device of claim 1 wherein the at least one remote device comprises a voice search engine.

3. The device of claim 2 wherein the resource access number accesses a root node of the voice search engine.

4. The device of claim 1 wherein the memory comprises a plurality of stored resource access numbers, wherein the speech recognizer is configured to recognize a plurality of spoken command words for accessing each stored resource access number, and wherein different resource access numbers access different nodes of a voice search engine search tree.

5. The device of claim 1 wherein the communication channel comprises a telephone network.

6. The device of claim 1 wherein the communication channel comprises a cellular network.

7. The device of claim 1 wherein the communication channel comprises an Internet.

8. The device of claim 1 wherein the resource access number is pre-stored in non-volatile memory.

9. The device of claim 1 wherein the resource access number is a telephone number.

10. The device of claim 1 wherein the resource access number is a URL.

11. A method comprising:
receiving input speech from a user in a Bluetooth headset;
recognizing the input speech on the Bluetooth headset, and outputting a command if the input speech is recognized as an utterance in a word set of a recognizer;
accessing a resource access number stored in a memory of the Bluetooth headset if the command matches a predefined criteria;
sending the resource access number and an externally executed command to a second electronic device, said second electronic device comprising a cellular phone,
wherein the externally executed command is received by the second electronic device and executed on the second electronic device, and in accordance therewith, the second electronic device uses the resource access number to establish a communication channel between said second electronic device and at least one remote device, and
receiving second input speech from the user, wherein the second speech input is sent from the Bluetooth headset to the second electronic device and through the communication channel to the at least one remote device, and the at least one remote device performs speech recognition on the second speech input.

12. The method of claim 11 wherein the at least one remote device comprises a voice search engine.

13. The method of claim 12 wherein the resource access number accesses a root node of the voice search engine.

14. The method of claim 11 wherein the memory comprises a plurality of stored resource access numbers, and wherein the word set of the recognizer is configured to recognize a plurality of utterances corresponding to the stored resource access numbers, and wherein a first resource access number is accessed if a corresponding first utterance is recognized and a second resource access number is accessed if a corresponding second utterance is recognized, and wherein different resource access numbers access different nodes of a voice search engine search tree.

15. The method of claim 11 wherein the communication channel comprises a telephone network.

16. The method of claim 11 wherein the communication channel comprises a cellular phone network.

17. The method of claim 11 wherein the communication channel comprises an Internet.

18. The method of claim 11 wherein the resource access number is a telephone number.

19. The method of claim 11 wherein the resource access number is a URL.

20. A wireless electronic device comprising:
a speech recognizer coupled to receive first speech input;
a memory, the memory comprising one or more stored resource access numbers;
a voice user interface for interacting with a user using speech recognition or speech synthesis; and
a Bluetooth wireless transceiver for communicating with a second electronic device, the second electronic device comprising a cellular phone,
wherein said wireless electronic device is a Bluetooth headset,
wherein the speech recognizer is configured to recognize a first spoken command word, and wherein if the first command word is recognized in the first speech input, then the speech recognizer generates a corresponding first command result, and
wherein if the first command result matches a predefined criteria, then the Bluetooth headset automatically accesses the resource access number from memory and establishes a Bluetooth communication channel between said Bluetooth headset and the second electronic device and sends the resource access number and an externally executed command to the second electronic device,
wherein the externally executed command and resource access number are received by the second electronic device, and the externally executed command is executed on the second electronic device, and in accordance therewith, the second electronic device uses the resource access number to establish a communication channel between said second electronic device and at least one remote device, the at least one remote device comprising a voice search engine, and
wherein a user provides second speech input to said microphone, and wherein the second speech input is sent from the Bluetooth headset to the second electronic device and through the communication channel to the at least one remote device, and the voice search engine on the at least one remote device performs speech recognition on the second speech input.

21. The device of claim 20 wherein the resource access number is a URL.

22. The device of claim 20 wherein the resource access number is a telephone number.

23. The device of claim 20 wherein the memory comprises a plurality of stored resource access numbers, and wherein the speech recognizer is configured to recognize a plurality of spoken command words to recognize a plurality of utterances corresponding to the stored resource access numbers, and wherein a first resource access number is accessed if a corresponding first utterance is recognized and a second resource access number is accessed if a corresponding second utterance is recognized, and wherein different resource access numbers access different nodes of a voice search engine search tree.

24. The device of claim 20 wherein the communication channel comprises a telephone network.

25. The device of claim 20 wherein the communication channel comprises a cellular phone network.

26. The device of claim 20 wherein the communication channel comprises an Internet.

27. The device of claim 20 wherein the communication channel comprises a wireless network.

* * * * *